United States Patent
Banerjee et al.

(10) Patent No.: US 10,343,916 B2
(45) Date of Patent: Jul. 9, 2019

(54) GRAPHENE FILMS AND METHODS OF MAKING THEREOF

(75) Inventors: Sarbajit Banerjee, Amherst, NY (US); Vincent Lee, Hamilton (CA); Luisa Whitaker, Lawrenceville, NJ (US)

(73) Assignee: The Research Foundation for The State University of New York, Amherst, NY (US)

( * ) Notice: Subject to any disclaimer, the term of this patent is extended or adjusted under 35 U.S.C. 154(b) by 0 days.

(21) Appl. No.: 13/704,054

(22) PCT Filed: Jun. 16, 2011

(86) PCT No.: PCT/US2011/040740
§ 371 (c)(1),
(2), (4) Date: Feb. 27, 2013

(87) PCT Pub. No.: WO2011/159922
PCT Pub. Date: Dec. 22, 2011

(65) Prior Publication Data
US 2013/0156678 A1    Jun. 20, 2013

Related U.S. Application Data

(60) Provisional application No. 61/355,290, filed on Jun. 16, 2010.

(51) Int. Cl.
| | | |
|---|---|---|
| C01B 31/04 | (2006.01) | |
| C25D 13/00 | (2006.01) | |
| B82Y 30/00 | (2011.01) | |
| B82Y 40/00 | (2011.01) | |
| C25D 13/02 | (2006.01) | |
| C25D 13/18 | (2006.01) | |
| C25D 13/22 | (2006.01) | |
| C01B 32/23 | (2017.01) | |
| C01B 32/182 | (2017.01) | |
| C01B 32/19 | (2017.01) | |
| C01B 32/192 | (2017.01) | |

(52) U.S. Cl.
CPC ......... C01B 31/0438 (2013.01); B82Y 30/00 (2013.01); B82Y 40/00 (2013.01); C01B 32/182 (2017.08); C01B 32/19 (2017.08); C01B 32/192 (2017.08); C01B 32/23 (2017.08); C25D 13/02 (2013.01); C25D 13/18 (2013.01); C25D 13/22 (2013.01); C01B 2204/30 (2013.01); C01B 2204/32 (2013.01)

(58) Field of Classification Search
CPC ........... C01B 31/0496; C01B 2204/02; C01B 2204/04; C01B 2204/30
USPC ...................................................... 423/447.1
See application file for complete search history.

(56) References Cited

U.S. PATENT DOCUMENTS

| | | | |
|---|---|---|---|
| 2009/0017211 A1 | 1/2009 | Gruner et al. | |
| 2009/0235721 A1* | 9/2009 | Robinson et al. | ........... 73/31.05 |
| 2010/0127312 A1 | 5/2010 | Grebel et al. | |
| 2010/0203340 A1* | 8/2010 | Ruoff et al. | .................. 428/408 |
| 2011/0227000 A1* | 9/2011 | Ruoff et al. | .................. 252/502 |

FOREIGN PATENT DOCUMENTS

WO    2008/128554 A1    10/2008

OTHER PUBLICATIONS

De Arco et al. ("Synthesis, Transfer, and Devices of Single- and Few-Layer Graphene by Chemical Vapor Deposition", IEEE Transactions on Nanotechnology, Vo. 8, No. 2, Mar. 2009, pp. 135-138.*
Wang et al. "Band-like Transport in Surface-Functionalized Highly Solution-Processable Graphene Nanosheets", Adv. Mater. 2008, 20, pp. 3440-3446.*
Lee et al. ("Substrate Hybridization and Rippling of Graphene Evidenced by Near-Edge X-ray Absorption Fine structure Spectroscopy", J. Phys. Chem. Lett. 2010, 1, 1247-1253.*
http://www.dr-aart.nl/Arithmetic-negative-numbers-greater-than-and-less-than.html, year unknown.*
Lee, V., et al., Large-Aea Chemically Modified Graphene Films: Electrophoretic Deposition and Characterization by Soft X-ray Absorption Spectroscopy, Chem. Mater. 2009, vol. 21, pp. 3905-3916.

* cited by examiner

*Primary Examiner* — Kishor Mayekar
(74) *Attorney, Agent, or Firm* — Hodgson Russ LLP

(57) ABSTRACT

Provided are methods for forming graphene or functionalized graphene thin films. Also provided are graphene and functionalized graphene thin films formed by the methods. For example, electrophoretic deposition methods and stamping methods are used. Defect-free thin films can be formed. Patterned films can be formed. The methods can provide conformal coatings on non-planar substrates.

10 Claims, 10 Drawing Sheets

GRAPHENE FILMS AND METHODS OF MAKING THEREOF

CROSS-REFERENCE TO RELATED APPLICATIONS

This application claims priority to U.S. provisional patent application No. 61/355,290, filed Jun. 16, 2010, the disclosure of which is incorporated herein by reference.

FIELD OF THE INVENTION the present invention generally relates to graphene films and methods of making graphene films. More particularly, the present invention relates to electrophoretic and physical methods of making graphene films.

BACKGROUND OF THE INVENTION

Recent experimental progress in developing methods for fabricating strictly 2D crystals that were previously believed to be thermodynamically unstable have lead to remarkable paradigm-shifting discoveries in solid state physics. Graphene, a single layer of graphite, has attracted tremendous interest from the scientific community owing to its remarkable properties such as the room-temperature half-integer quantum Hall effect, the massless Dirac fermion nature and extremely high mobilities of its charge carriers, the tunability of its band gap (for graphene nanoribbons), and the potential for realizing ballistic conduction. Graphene also possesses fascinating thermal and mechanical properties, which make it an attractive candidate for potential applications such as in electromechanical resonators, stretchable and elastic matrices for flexible electronic circuitry, stable field emitters, ultracapacitors, and as fillers for electrically conducting flexible nanocomposites.

The fabrication of large-area graphene represents a formidable challenge that must be overcome to realize the potential of this material, although some progress has been achieved very recently using chemical vapor deposition and epitaxial growth methods. Several approaches have been reported for obtaining single graphene sheets on substrates including the original micromechanical cleavage "scotch tape" method involving the repeated exfoliation of graphite mesas; however, this method gives a very low yield of typically sub-100 μm graphene flakes masked by hundreds of thicker flakes of graphite and is thus unsuitable for precise positioning of graphene structures within device architectures and for scaling to practical quantities. Alternative approaches that have recently been reported include epitaxial growth on SiC and the chemical vapor deposition of $CH_4$ over nickel catalysts. High mobilities for graphene nanoribbons with lateral dimensions <10 nm have been obtained by the chemical exfoliation of commercial graphite using forming gas followed by surfactant-assisted dispersion in non-polar solvents. The obtained nanoribbons are semiconducting and exhibit on/off ratios as high as $10^7$. Solution-chemistry-based approaches involving the initial oxidation of graphite to graphite oxide, followed subsequently by the mechanochemical or thermal exfoliation of graphite oxide to graphene oxide sheets, and their eventual reduction to graphene have also attracted much attention owing to the facile scalability and high yields obtained for these processes.

BRIEF SUMMARY OF THE INVENTION

The present disclosure provides a method of synthesizing graphene utilizing, e.g., electrophoretic deposition. It is a facile, rapid, and scalable electrophoretic deposition approach developed for the fabrication of graphene films on conductive substrates. The method is suited for large-area conformal chemically derived graphene films based on the electrophoretic deposition of graphene and functionalized graphene.

in an embodiment, the present invention provides electrophoretic methods of forming graphene or functionalized graphene thin films. For example, the method for forming graphene thin films or functionalized graphene coatings comprises the steps of: a) providing a conducting substrate; and b) electrophoretically depositing the graphene or functionalized graphene using a solution comprising exfoliated graphene sheets or exfoliated functionalized graphene sheets, such that a thin film of graphene or functionalized graphene is formed on the substrate. If the functionalized graphene thin film is graphene oxide, the method further comprises the step of exposing the graphene oxide thin film to a reducing agent, such that reduced graphene oxide is formed.

For example, the electrophoretic deposition is carried out by applying a voltage having a DC component and/or an AC component between two electrodes. The voltage is continuous, pulsed, or arbitrarily increasing or decreasing with time. If the voltage has an AC component, the AC component has variable frequency and amplitude.

The reducing agent can be present in a slurry, a solution, liquid form, or gaseous form. Example of suitable reducing agents include, but are not limited to, hydrazine, phenylhydrazine, sodium borohydride, potassium borohydride, lithium borohydride, calcium hydride, lithium hydride, sodium hydride, potassium hydride, lithium aluminum hydride, strontium hydride, barium hydride, ascorbic acid, potassium hydroxide, potassium napthalide, lithium napthalide, sodium napthalide, potassium phenanthrene, lithium phenanthrene, sodium phenanthrene, potassium biphenyl, and combinations thereof. The graphene oxide thin film can be exposed to a reducing agent at a temperature from 77 K to 800 K.

The method can, optionally, further comprising the step of thermally annealing the graphene or functionalized graphene (e.g., graphene oxide) thin film. The thermal annealing can be carried out at a temperature of 50° C. to 750° C., over a time of from 1 minute to 10 hours. The thermal annealing can be carried out at a pressure of from $1 \times 10^{-9}$ torr to $1 \times 10^3$ torr. The thermal annealing can be carried out in an atmosphere of air, hydrogen, oxygen, argon, helium, nitrogen, methane, ethane, propane, butane, carbon monoxide, carbon dioxide, ethylene, or a mixture thereof.

The solvent of the solution comprising exfoliated graphene oxide sheets or functionalized graphene sheets can be water, ethanol, 2-propanol, n-propanol, butanol, 1,3-butanediol, ethylene glycol, tetrahydrofuran, dimethylformamide, dimethyl sulfoxide, benzyl benzoate, N-methylpyrrolidone, γ-butyrolactone, pentane, hexanes, cyclohexane, cyclohexanone, ethyl acetate, acetic acid, glyme, diglyme, triglyme, liquid $NH_3$, and ionic liquid or a mixture thereof. The exfoliated graphene or exfoliated functionalized graphene sheets are present in the solution at concentrations of from $1 \times 10^{-6}$ mg/mL to 100 mg/mL. The solution can, optionally, comprises an additive selected from a salt, a surfactant, a polyelectrolyte, a biological macromolecule, and combinations thereof.

The conducting substrate can be a non-planar substrate. The film can be deposited on a continuous area of at least 16 square inches.

In another embodiment, the present invention provides stamping methods of forming graphene or functionalized graphene (e.g., graphene oxide) thin films. For example, a method for forming graphene oxide comprises the steps of: a) providing a organic or inorganic membrane; b) depositing a thin film of graphene oxide on a surface of a temporary substrate, such that the thin film covers at least a portion of the temporary substrate; c) placing the temporary substrate on a substrate, such that the thin film of graphene oxide is in contact with the substrate; d) applying pressure (e.g., 1 atm to 100,000 atm) to the temporary substrate, such that the graphene oxide film is transferred from the membrane to the substrate (e.g., insulating or non-insulating substrates); and e) exposing the graphene oxide thin film to a reducing agent, such that a reduced graphene oxide film is formed.

The substrate for the stamping method can be insulating or non-insulating. For example, the substrate can be a metal, a metal alloy, or glass, or polymer. If the substrate is a metal or metal alloy the substrate can be a foil, a single crystal, or a coating on non-conducting substrates.

Examples of suitable reducing agents include, but are not limited to, hydrazine, phenylhydrazine, sodium borohydride, potassium borohydride, lithium borohydride, calcium hydride, lithium hydride, sodium hydride, potassium hydride, lithium aluminum hydride, strontium hydride, barium hydride, ascorbic acid, potassium hydroxide, potassium napthalide, lithium napthalide, sodium napthalide, and combinations thereof. The reducing agents can be applied in slurry, liquid, or vapor form. The concentrations of reducing agents in solution can range from $1 \times 10^{-6}$ M to 10 M. Also, the reducing agent can be a neat liquid where appropriate. Solutions can be used in any of the solvents described above. The temperature for application of pressure or reducing agent can range from 77 K to 800 K.

In an aspect, the present invention provides a graphene or functionalized graphene (e.g., graphene oxide) thin film on a substrate, where the thin film is free of detectable pin-hole defects. In various examples, the thin film can have 1% per unit area or less defects per square centimeter and/or 3% or less impurities. In another example, the thin film can have surface contamination with extraneous impurities limited to 3% or less surface coverage.

DETAILED DESCRIPTION OF THE INVENTION

Figure 1:
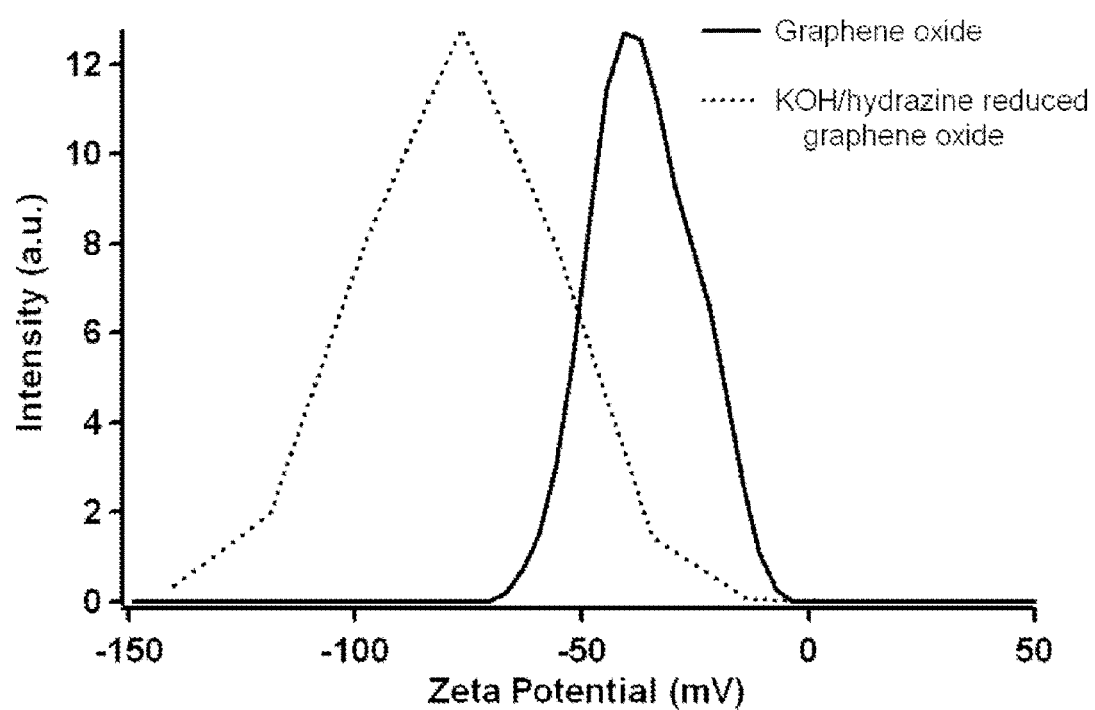
FIG. 1. ζ-potential distribution of graphene oxide and KOH/hydrazine-reduced graphene oxide sheets dissolved in water.

The present invention provides graphene and functionalized graphene compositions and methods of making the same. In various embodiments, the present invention provides methods of forming graphene thin films using electrophoresis or physical transfer methods such as transfer printing and stamping. In various other embodiments, the present invention provides graphene oxide and reduced graphene oxide films made using the methods.

Graphene, a single layer of graphite, is a highly conductive material with immense potential for use in the next generation of electronics applications. The potential for realizing ballistic conduction and its fascinating thermal and mechanical properties make graphene an interesting candidate in flexible electronics, conductive inks, ultracapacitors, and as fillers in polymers. Synthesis of graphene begins with the oxidation of graphite to graphite oxide and subsequent exfoliation to graphene oxide through ultrasonication. The graphene oxide can then be reduced to graphene using hydrazine or other reducing agents. The present invention, in several embodiments, pertains to two distinctive methods for the fabrication of large-area conductive graphene films on conductive and non-conductive substrates. The first method involves the electrophoretic deposition of graphene oxide and reduced graphene oxide from aqueous solutions onto conductive substrates such as indium tin oxide and steel. The second method involves transfer printing of graphene oxide and reduced graphene oxide onto non-conductive substrates including glass and plastic. Characterization of the graphene films was carried out using near-edge X-ray absorption fine structure (NEXAFS), Raman spectroscopy, profilometry and four-point probe electrical conductivity measurements. NEXAFS was used to probe the electronic structure and alignment of these chemically modified graphene films. Raman spectroscopy and conductivity measurements were used to study the effect of reduction of graphene oxide to reduced graphene oxide.

Graphene, presumed not to exist in the free state until its discovery in 2004, is a two dimensional (2D) single layer of graphite in a honeycomb lattice. Graphene is the building block of graphite, fullerenes, and carbon nanotubes. Graphene exhibits unique properties such as the Quantum Hall effect at room temperature, high mobility of its charge carriers, and ballistic conduction. Graphene has been synthesized by many methods including mechanical exfoliation (Scotch tape method), chemical vapor deposition, epitaxial growth, and solution-based approaches. A solution-based approach including the oxidation and exfoliation of graphite followed by the reduction to graphene was used here (modified Hummers method). The price of indium tin oxide (ITO) has grown significantly due to the rarity of elemental indium on earth so there is a need for a cheaper alternative to serve as a transparent conducting electrode and graphene may be a viable option.

This disclosure provides methods to synthesize graphene films and functionalized graphene thin films. By functionalized graphene it is meant that graphene is functionalized with functional groups such as, for example, fluorides, chlorides, bromides, alkenes, alkynes, epoxides, alcohols, phenols, carboxylic acids, ketones, quinones, lactones, amines, amides, imines, diazo moieties, cyanides, isocyanides, thionylchlorides, thiols, sulfites, sulfates, or a combination thereof. The functional groups can be located on the surface of the graphene and/or within layers of the thin film. For the sake of clarity, functionalized graphene is meant to include graphene oxide. Completely hydrogenated graphene is also referred to as functionalized graphene. Graphene is also referred to herein as reduced graphene oxide. In various embodiments, the present method provides electrophoretic methods and stamping methods of depositing graphene or functionalized graphene. In an embodiment, the present invention provides methods (e.g., electrophoretic deposition) of depositing graphene or graphene oxide that does not require any cross-linking molecules or binders.

Figure 12:
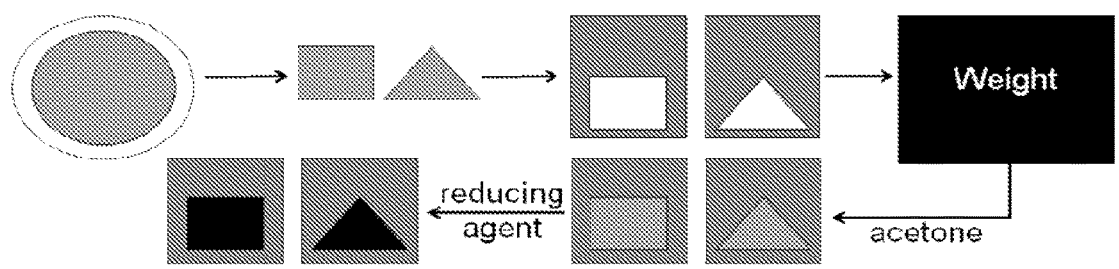
FIG. 12. Schematic of graphene oxide transfer printing technique.

One example of such a method is electrophoretic deposition where graphene or functionalized graphene is deposited onto a conductive substrate such as ITO using graphene oxide and reduced graphene oxide. An electric field is applied across parallel plates and charged particles migrate to the electrodes. Another method disclosure here is transfer printing (see FIG. 12). This method can be used to fabricate films on nonconductive substrates such as glass and plastic. Solutions vacuum filtered onto a membrane with, for example, 0.025 µm pore size and transferred by applying pressure.

Another method is spray coating. For example, graphene can be deposited on a steel substrate that has been pickled (heated in 8% by volume HCl at 80° C., rinsed in water and air dried) to clean the substrate surface prior to coating. Spray coating can provide thick coatings, coating both sides and the edges of a substrate, and multilayered coatings. Examples of other methods include dip coating, spin-coating, chem.-coating, roller-coating, silk-screen printing, evaporation, and stamping.

Graphene can be applied to plastic and glass with the disclosed method. Transfer printed films of graphene oxide can be reduced to reduced graphene oxide with several methods. Reduced graphene oxide can be transfer printed as well.

Multilayered coating can be used. For example, vanadium oxide and carbon nanotubes can be used as a coating on the substrate to provide an underlying layer between the substrate and the deposited graphene or functionalized graphene.

In an aspect, the present invention provides methods of making graphene or functionalized graphene thin films. In various embodiments, the method comprises the steps of: a) providing a conducting substrate; and b) depositing the graphene (e.g., reduced graphene oxide) or functionalized graphene (e.g., graphene oxide) by electrophoresis from a solution comprising exfoliated graphene oxide sheets or reduced graphene oxide sheets, such that a thin film of graphene oxide or reduced graphene is formed on the substrate. If the thin film is graphene oxide, the method further comprises the step of exposing the graphene oxide thin film to a reducing agent, such that reduced graphene oxide is formed.

Any conducting substrate with sufficient conductivity to carry out electrophoretic deposition of graphene or functionalized graphene can be used. Substrates such as, for example, metals (and metal alloys), metal (and mixed metal) oxides, and conducting polymers can be used. Examples of metals include, but are not limited to, gold, carbon steel, stainless steel, galvanized steel, titanium, aluminum, zinc, copper, tungsten, molybdenum, cobalt, nickel, and alloys of such metals. Indium tin oxide is an example of a conducting bimetallic oxide. Examples of conducting polymers include, but are not limited to, poly(3,4-ethylenedioxythiophene) (PEDOT), polypyrrole, polyaniline, polythiophene, and functionalized versions of such polymers. The substrate can have any form that is suitable for electrophoretic deposition. For example, metal/metal alloy substrates could be in foil form, single crystals, or coatings on non-conducting substrates. In various embodiments, the substrate is a nonplanar substrate. For example, the substrate can be spherical, hemispherical, oblate, curved, or elliptical. As another example, the substrate can be a near-net-shape part with any specified two-dimensional or three-dimensional shape.

Exfoliated graphene or functionalized graphene sheets can be obtained by standard methods. Examples of methods of making functionalized graphene can be found in U.S. Pat. Nos. 7,169,329, 6,875,274, 7,189,455, 7,122,165, and 7,481,990, the disclosures of which with respect to functionalization methods are incorporated herein by reference. Another example of such methods can be found in Banerjee et al. Adv. Mater., 2005, 17, No. 1, the disclosure of which with respect to functionalization methods is incorporated herein by reference.

the solution comprises exfoliated graphene or functionalized graphene sheets. The solution can be a dispersion of the sheets in a solvent or mixture of solvents. Solvents such as water, ethanol, 2-propanol, n-propanol, butanol, 1,3-butanediol, ethylene glycol, tetrahydrofuran, dimethylformamide, dimethyl sulfoxide, benzyl benzoate, N-methyl pyrrolidone, γ-butyrolactone, pentane, hexanes, cyclohexane, cyclohexanone, ethyl acetate, acetic acid, trifluoroacetic acid, glyme, diglyme, triglyme, liquid $NH_3$, ionic liquids, and mixtures of such solvents. Any ionic liquid can be used. Examples of ionic liquids include, but are not limited to, ionic liquids with 1-ethyl-3-methyl-1H-imidazolium ions, 1-butyl-3-methyl-1H-imidazolium ions, 1-butylpyridinium ions, and bis(trifluoromethylsulfonyl)imide ions.

For example, the concentration of exfoliated graphene oxide or reduced graphene oxide sheets in the solution can range from $1\times10^{-6}$ mg/mL to 100 mg/mL, including all values to the $10^{-6}$ mg/mL and ranges therebetween. The stability of the dispersions can range from transient, e.g., less than 10 seconds, to long-lasting, e.g., less than 6 months.

The solution, optionally, comprises an additive or additives. Examples of additives include, but are not limited to, salts, surfactants, polyelectrolytes and biological macromolecules. Examples of salts include, but are not limited to, metal salts such as alkali metal, alkaline earth metal, transition metal, and lanthanide metal sulfates, sulfites, sulfides, nitrates, nitrites, phosphates, hydrogen phosphates, chlorides, bromides, iodides, and triflates. Specific examples of such salts include NaCl, $MgCl_2$, $NaNO_3$, $KNO_3$, KCl, $CaCl_2$, $Ca(NO_3)_2$. Any surfactant can be used. For example, polymeric or amphiphilic species can be used. Examples of surfactants include, but are not limited to, Triton X 100™, Pluronic® F123, Pluronic® F127, sodium dodecyl sulfate, sodium dodecylbenzene sulfate, cetyltrimethylammonium bromide, cetyltrimethylammonium chloride. Additional charged electrolytes include, for example, polyelectrolytes such poly acrylic acid, poly(sodium styrene sulfonate), poly(allylamine hydrochloride), poly(diallyldimethylammonium chloride), poly(acrylamide-co-diallyldimethylammonium chloride), poly(2-acrylamido-2-methyl-1-propanesulfonic acid), poly(4-styrenesulfonic acid), poly(4-styrenesulfonic acid-co-maleic acid), and poly(vinylsulfonic acid). Further examples of polyelectrolytes include biological macromolecules such as polypeptides, nucleic acids, and DNA/RNA. Without intending to be bound by any particular theory, it is considered addition of additives can increases the charge on the graphene species. The increased charge is desirable for electrophoretic deposition.

The methods can be physical deposition methods. In an embodiment, the method for depositing graphene or functionalized graphene comprises the steps of: a) providing a membrane which is a temporary substrate; b) depositing the graphene or functionalized graphene on a membrane (e.g., filtering an exfoliated graphene or reduced graphene oxide solution through the membrane thereby depositing a thin film of graphene oxide on a surface of a temporary substrate), such that the thin film covers at least a portion of the membrane; c) placing the membrane on a final substrate, such that the thin film of graphene or functionalized graphene is in contact with the substrate; d) applying pressure to the temporary substrate, such that the graphene oxide film is transferred from the temporary substrate to the final substrate. The applied pressure can range from 1 atm to 100,000 atm, including all values to the atm and ranges therebetween.

The membrane (i.e., temporary substrate) is any material on which the graphene or functionalized graphene can be deposited and subsequently transferred by physical means on to a final substrate. It can be an organic material or an inorganic material. The membrane can be porous. For example, the membrane can have pores having a longest dimension, e.g., diameter, of from 10 nm to 500 nm, including all values to the nm and ranges therebetween. For example, if the solvent of exfoliated graphene or reduced graphene oxide solution is aqueous-based an organic or inorganic membrane can be used or if the solution is organic-based an inorganic membrane can be used. If the graphene or functionalized graphene is deposited on the membrane by filtration the membrane must be porous such that the solution can be filtered through it. For example, the membrane can be made of porous silicon, anodized alumina, polydimethylsiloxane, polytetrafluoroethylene, polycarbonate, nylon, cellulose ester, and nitrocellulose.

the final substrate can be insulating or non-insulating. Examples of insulating substrates include, but are not limited to, glass, silica, titania, alumina, zirconia, boron nitride, silicon carbide, molybdenum disulfide, boron phosphide, and hafnia substrates. Insulating substrates can be thin films deposited onto other substrates, free-standing monoliths, or single-crystals. Other examples of final substrates include, but are not limited to, metals, metal alloys, metal oxides, mixed metal oxides, plastic, and glass. Examples of final substrates include, indium tin oxide, gold, carbon steel, stainless steel, galvanized steel, titanium, aluminum, zinc, copper, tungsten, molybdenum, cobalt, nickel; any alloys, conducting polymer substrates including PEDOT, polypyrrole, polythiophene, and functionalized versions of polymers. Metallic substrates could be in foil form, as single crystals, alloys or coatings on non-conducting substrates. Some examples of insulating substrates include glass, silica, titania, alumina, zirconia, and hafnia substrates. Insulating substrates could be thin films themselves deposited onto other substrates, free-standing monoliths, or single-crystals.

If a functionalized graphene, e.g., graphene oxide, thin film is deposited on the final substrate, the functionalized graphene thin film is exposed to a reducing agent, such that a graphene film is formed. Examples of reducing agents include, but are not limited to, hydrazine, phenylhydrazine, sodium borohydride, potassium borohydride, lithium borohydride, calcium hydride, lithium hydride, sodium hydride, potassium hydride, lithium aluminum hydride, strontium hydride, barium hydride, ascorbic acid, potassium hydroxide, potassium napthalide, lithium napthalide, sodium napthalide, or any combination thereof. The reducing agents can be applied in slurry, liquid, or vapor form. The concentrations of reducing agent(s) in solution can range from $1 \times 10^{-6}$M to 10 M. An example of a desirable range of concentration of reducing agent(s) in solution is $1 \times 10^{-2}$M to 1 M. Examples of solvents that can be used include those mentioned above. The temperature for application of pressure or reducing agent can range from 77 K to 800 K, including all K values and ranges therebetween. An example of a desirable range of temperature for application of pressure or reducing agent is 300 K to 500 K.

All of the methods described herein may, optionally, further comprise the step of thermally annealing the graphene thin film or functionalized graphene thin film. For example, the thermal annealing can be performed in different stages or at different stages for different times with different ramp rates. The annealing temperature can range from 50° C. to 750° C., including all values to the ° C. and ranges therebetween. In various examples, the annealing temperature can be from 150° C. to 600° C. or 250° C. to 550° C. The annealing time can range from 1 second to 10 hours, including all values to the second and ranges therebetween. In an example, the annealing time is 10 minutes to 1 hour. The annealing step can be carried out at pressures ranging from vacuum (e.g., $1 \times 10^{-9}$ torr) to pressures greater than ambient (e.g., $1 \times 10^3$ torr). The annealing environment (i.e., atmosphere) can be vacuum, ambient air, or an atmosphere comprising a gas selected from hydrogen, oxygen, argon, helium, nitrogen, methane, ethane, propane, butane, carbon monoxide, carbon dioxide, ethylene, or a mixture thereof. It is within the purview of one having skill in the art to choose compatible annealing conditions. For example, annealing under air or oxygen can be performed up to 250° C., while annealing in a reducing (e.g., hydrogen, carbon monoxide, carbon dioxide, ethylene, methane, and ethane) or inert (e.g., helium, argon, and nitrogen) environments can be performed up to 750° C.

Deposition of the thin films can be carried out using electrochemical transfer methods such as, for example, electrophoresis. The electrophoretic deposition is carried out by placing two parallel metal electrodes within the graphene dispersion in an appropriate solvent and applying a constant, pulsed, or arbitrarily varying voltage or current for the set period of time. In an example, the electrodes are parallel sheets. In another example, one or both of the electrodes are wires or non-planar shapes. In an example, two electrodes are used. In another example, three electrodes are used with one electrode designated as the reference electrode. The deposition can be carried out in, for example, constant voltage or constant current mode. In other examples, the deposition can be performed using a pulsed voltage or current, or arbitrarily varying voltage or current.

For example, after deposition, the voltage/current is turned off before removal of the electrodes from solution. In another example, the voltage or current is continually applied or increased/decreased during removal of electrodes from solution. In yet another example, the applied voltage or current has an AC component of variable amplitude and frequency. The frequency of the AC component can range from $10^{-6}$ Hz to $10^7$ Hz, including all ranges therebetween. An example of a desirable range is 10 Hz to $10^6$ Hz, including all values to the Hz and ranges therebetween. It is within the purview of one having skill in the art to optimize one or all of voltage, current, precise voltage/current sequence, duration of electrophoretic deposition, and separation between the electrodes to control one or more of the deposition rate, number of deposited layers, and packing of deposited graphene layers.

The electrode separation can range from 10 nm (patterned via lithography) to 10 cm, including all values to the nm and ranges therebetween. An example of a desirable range is 500 microns to 5 mm. The speed at which the electrodes are removed from solution after completion of electrophoretic deposition can range from 0.1 µm/s (ulta-slow drying) to 100 mm/s (flash drying), including all values to the 0.1 µm/s and ranges therebetween. An example of a desirable deposition rate 1 micron/s to 1 mm/s, including all values to the µm/s and ranges therebetween.

In an example, one solvent is substituted for another solvent after electrophoretic deposition prior to drying. The applied voltage or current is continually applied or turned off while switching solvents. In an example, after deposition from an aqueous solution, the electrodes are quickly removed to acetone and then to supercritical $CO_2$, which is dried at its critical point ensuring retention of microporosity.

A wide range of deposition rates can be achieved using the methods of the present invention. For example, the rate of deposition can be controlled from 0.01 or less graphene or functionalized graphene monolayer/second (sub-monolayer coverage on average) to 500 monolayers/second. Rate control can be advantageous as generally slower deposition yields flatter films. As another example, the method where vertical packing density is achieved can provide graphene layer separations ranging from 0.34 nm (equivalent to graphite) to 2 nm (exceeding that of graphene oxide).

The methods disclosed herein can provide conformal coverage of a substrate or final substrate with a thin film of graphene or functionalized graphene. In various examples, the graphene or functionalized graphene thin film covers 90% or greater, or 99% or greater, of the substrate. In yet another example, the thin film is deposited on a continuous area of at least 16 square inches.

The methods can provide defect-free films. In various examples, the thin film has 1% or less defects per square centimeter. For example, defects may include pin-holes or surface roughness. The method can provide pinhole-free thin films. For example, the thin film is free of detectible pin-hole defects. In various examples, the pin-holes on an areal basis are 0.0001% or less, or 0.1% or less, or 1% or less of total film area. In example, the graphene or functionalized graphene thin film is pinhole-free and has 99.9% or greater coverage on an areal basis. The pin-hole defects can be determined by, for example, by imaging using scanning tunneling microscopy, atomic force microscopy.

The methods can provide thin films with low levels of impurities. In various examples, the thin films have 3% or less or 1% or less impurities. For example, the films can have 1% or less defects per square centimeter and the thin film has 3% or less impurities. In other examples, the thin film immediately after deposition has surface contamination with extraneous impurities of 1% or less surface coverage or 3% or less surface coverage. Impurities as used herein refers to all molecular species or materials not directly covalently bound to the graphene surface, but are on the surface (or in proximity to the surface) or incorporated within layers of the thin film. For example, the impurities can be physisorbed on or ionically interact with a graphene or functionalized graphene surface. Examples of impurities include, but are not limited to, polymeric or adhesive residues, metal atoms, salts, and debris from plasma processing. Impurities do not include covalently bound moieties on graphene such as may be used to functionalize graphene surfaces prior to deposition. The presence of and quantification of impurities can be determined by, for example, by scanning tunneling microscopy, atomic force microscopy, time-of-flight secondary ion mass spectrometry, and X-ray photoelectron spectroscopy.

The methods can provide thin films with interlayer separation and/or desirable density. For example, thin films with interlayer separation of 2 nm to 0.34 nm, including all values to the 0.01 nm and ranges therebetween. The density of the thin films can be from 2.09 g/cc to 2.25 g/cc, including all values to 0.01 g/cc and ranges therebetween.

the methods provide thin films dichroic ratio values of greater than 0.7. The films have desirable flatness with 70% or greater benzenoid fragments of graphene oriented in plane with the substrate. The dichroic ratio can be measured by, for example, NEXAFS spectroscopy. This ratio is related to alignment and conformal adherence of the film to the substrate.

The methods provide thin films with desirable surface roughness. For example, the surface roughness can range from 0.4 nm to 20 nm, including all values to the nm and ranges therebetween. The thin films have desirable adhesion to the substrate. For example, the films pass ASTM adhesion testing such as scotch tape (e.g., ASTM D3359), scribe tests, and chemical resistance testing (e.g., such as ASTM D1308).

the methods can provide films with desirable levels of residual chemical functional groups. For example, residual functional groups can range from 2 oxygen/nitrogen/sulfur atoms per every 6 carbon atoms to 1 oxygen/nitrogen/sulfur atom per 1000 or 10,000 carbon atoms. Examples of residual functional groups include, but are not limited to, epoxides, alcohols, phenols, carboxylic acids, ketones, lactones, amines, amides, imines, cyanides, isocyanides, thionylchlorides, thiols, sulfites, and sulfates.

In an aspect, the present invention provides graphene or functionalized graphene thin films made by the methods disclosed herein. The thin films are comprised of one or more layers of graphene or functionalized graphene. The thin films can have a thickness of from 1 nm to 1 µm, including all values to the nanometer and ranges therebetween.

The following examples are presented to illustrate the present invention. They are not intended to be limiting in any manner.

EXAMPLE 1

Provided in this example are two approaches for fabricating large-area graphene samples on conductive and non-conductive substrates. In the first approach, electric fields are used to deposit oriented conformal graphene films on conducting substrates such as stainless steel, carbon steel, and indium tin oxide (ITO). In the second approach filtration and transfer printing are combined to obtain large-area graphene films on glass and polyimide substrates. The approach pertains to a facile and fully scalable electrophoretic deposition approach for the fabrication of smooth conformal films of graphene oxide and chemically derived graphene sheets on conductive substrates. Two distinct approaches for fabricating chemically derived graphene films by electrophoretic deposition are disclosed. In the first approach, exfoliated graphene oxide sheets are electrophoretically deposited onto an ITO-coated glass substrate from aqueous solution and the resulting films are reduced by dipping in an aqueous solution of hydrazine hydrate. In the second approach, reduced graphene films are fabricated directly by electrophoretic deposition from an aqueous solution of reduced graphene platelets prepared by the hydrazine reduction of exfoliated graphene oxide in a strongly alkaline KOH solution. Conformal graphene films with good adhesion to underlying substrates as prepared herein can be important building blocks for the fabrication of ultracapacitors, graphene-based field emitters, novel nanostructured anodes, and nanostructured coatings combining chemical stability, corrosion resistance, optical transparency, and electrical conductivity.

The electrophoretic deposition of graphene films does not require addition of any cross-linking molecules or binders and further affords significantly enhanced film assembly rates. Furthermore, as demonstrated herein, electrophoretic deposition yields far better packing and alignment of the graphene components as compared to spray-coating techniques. The good alignment of graphene components within the films is desirable for optimizing the transport properties of the films. Furthermore for use as, for example, hydrophobic coatings, it is desirable to have films with desirable conformal alignment of the graphene components within the films so that the basal planes are parallel to the substrate. Generation of residue-free surfaces without substantial contamination of electron-hole puddles is desirable for high conduction in graphene films.

Experimental. Preparation of graphite oxide and graphene oxide: Graphite powders purchased from Qingdao Hensen Graphite Co. (China) with platelet sizes ranging from 150-300 µm were used for the preparation of bulk graphite oxide. A modified version of Hummer's method was used to oxidize graphite to graphite oxide. Briefly, 0.25 g of natural graphite powder and 0.125 g of $NaNO_3$ were added to 5.75 mL of $H_2SO_4$ under stirring in a flask that had been cooled to 0° C. using an ice bath. Next, 0.75 g of $KMnO_4$ was added slowly to the flask keeping the temperature below 20° C. Subsequently, the ice bath was removed and the flask was heated to 35° C. and maintained at this temperature for 30 min, followed by the slow addition of 11.5 mL of deionized (DI) water (Note: Caution must be exercised since this is a highly exothermic process). The temperature of the reaction mixture increased to ~98° C. upon the addition of water and the reaction vessel was maintained at this temperature for 15 minutes. Next, the suspension was further diluted with 34 mL of water and treated with 3% $H_2O_2$ until the cessation of gas evolution. Finally, the suspension was vacuum filtered and left to dry under vacuum overnight after washing with copious amounts of DI $H_2O$. The solid graphite oxide thus obtained was then exfoliated in DI water by ultrasonication using a Ti tip sonicator (UP50H Hielscher Ultrasound Technology, power: 45 W; frequency: 30 kHz) for 2 hours to form a graphene oxide suspension with a concentration of ~1 mg/mL. A homogeneous light yellow-brown solution was obtained after ultrasonication and was used for electrophoretic deposition without the addition of any additional "chargers".

Preparation of reduced graphene dispersion: An aqueous suspension of chemically modified graphene sheets was obtained using the KOH/hydrazine reduction protocol developed by Ruoff, Nguyen, and co-workers. Potassium hydroxide was added to the exfoliated graphite oxide dispersion described above until the pH was between 10 and 11, and this solution was then stirred for 2 hours before the addition of hydrazine hydrate. The hydrazine:graphene-oxide weight ratio was kept at 1:8. The reaction mixture was then stirred for 12 hours at 35° C. Next, the resulting suspension was vacuum filtered through a fritted filter to remove large particles and the homogeneous filtrate comprising well dispersed reduced graphene sheets was used for electrophoretic deposition. A control sample was also prepared by the reduction of graphene oxide using hydrazine without the addition of KOH.

Electrophoretic Deposition of Graphene Oxide and Reduced Graphene Oxide Films: The exfoliated graphene oxide and reduced graphene oxide sheets were deposited onto ITO coated glass electrodes (Delta Technologies, sheet resistance Rs=5-10 Ω/square; dimensions of 12.5 mm×25 mm×0.5 mm) using a home-built electrophoretic deposition setup. Briefly, a pair of ITO-coated glass electrodes with a separation of 2 mm was mounted onto glass slides with the conducting ITO sides facing each other to simulate a parallel-plate-like geometry. The entire electrode assembly was placed within the sample holder of a TL0.01 dip coater (MTI Corp.). Conducting leads were attached to the two ITO electrodes using Ag paste and the set of electrodes were slowly submerged into the appropriate graphene-oxide/reduced graphene oxide aqueous solution. Electrophoretic deposition was performed in constant current mode at DC currents of 0.1-1.0 mA using a Keithley 220 programmable current source. After electrophoretic deposition for 1-15 minutes, the graphene-coated films were withdrawn from the solutions at a rate of <0.3 mm min$^{-1}$ using the dip-coater.

Print-Stamping of Graphene Oxide Films: An aqueous suspension of graphene oxide (GO) with a concentration of ~1 mg/mL was used to prepare transfer-printed graphene oxide films by following the procedure analogous to that developed by Eda, Fanchini, and Chhowalla. 20 mL of this aqueous suspension was vacuum-filtrated using a mixed cellulose ester membrane with 25 nm pores (Millipore). The thickness of the obtained film could be controlled by changing the volume of the GO suspension used. The filtrated graphene oxide film was allowed to dry under vacuum and then the membranes were cut into six sections, wetted with deionized water and pressed against glass substrates by the application of pressures ranging from 1.5-100,000 atm. The GO was then allowed to dry under at least a 1 kg weight for ~12 hours. The membrane was then dissolved by continuous, rinsing in acetone and methanol.

Reduction of Transfer Printed Graphene Oxide Films: The transfer-printed films were reduced by five different methods, leaving one section unreduced for further characterization. The first method involved dipping the film into a 3.4 mM aqueous solution of hydrazine. The second method involved dipping the film into an anhydrous hydrazine solution. The third method had the film exposed to vapor phenylhydrazine in vacuum followed by annealing in an argon atmosphere at 200° C. for 2 hours. The fourth method involved dipping the film into a pure phenylhydrazine solution. The fifth method involved dipping the film into an aqueous solution of 0.05 M $NaBH_4$. All films were then rinsed with deionized water and dried with a nitrogen air gun.

After transfer printing of graphene oxide, several reduction protocols are possible: a) Dipping into liquid hydrazine; b) Dipping into liquid phenylhydrazine; c) Dipping into 0.50 M aqueous $NaBH_4$; d) Dipping into 3.40 mM aqueous hydrazine; e) Exposure to vapor phenylhydrazine under vacuum followed by annealing; f) No reduction.

Characterization: Differential scanning calorimetry (DSC, Q200, TA instruments) measurements under a flowing gaseous nitrogen atmosphere over a temperature range from −20 to 500° C. were used to study the thermal behavior of graphite oxide and reduced graphite oxide. The ζ-potentials of the exfoliated graphene oxide and reduced graphene oxide suspensions were measured using a Malvern Nano ZS90 instrument with irradiation from a 632.8 nm He—Ne laser. The chemically modified graphene solutions were filled in folded capillary cells and measured using a mixed mode method combining fast field and slow field reversal, which eliminated electroosmotic effects. The Smoluchowski approximation was used to calculate the ζ-potential of the graphene platelets from the electrophoretic mobility distribution for all the aqueous solutions studied here.

An Olympus BX41 optical microscope was used to obtain digital images of the surfaces of the electrophoretically deposited films and transfer-printed films. The morphologies and uniformity of the electrophoretically deposited films were also examined by scanning electron microscopy (SEM, JSM-5610LV) at an accelerating voltage of 20 kV. Raman spectra of the precursor graphite oxide, electrophoretically deposited films, and transferprinted films were acquired using a Horiba Jobin Yvon Labram HR system with 514.5 nm laser excitation. The thickness of the transfer-printed films was measured with KLA Tencor Alpha-Step IQ Surface Pro filer. Sheet resistance measurements were acquired using an Alessi Four-Point Probe setup.

Carbon and oxygen K-edge NEXAFS measurements were performed at the National Institute of Standards and Technology (NIST) beamline U7 A of the National Synchrotron Light Source at Brookhaven National Laboratory. A toroidal spherical grating monochomator with 600 lines/mm was used to acquire C K-edge data yielding an energy resolution of ~0.1 eV, whereas a 1200 lines/mm grating was used to acquire O K-edge spectra with an energy resolution of ~0.15 eV. NEXAFS spectra were collected in partial electron yield (PEY) mode with a channeltron electron multiplier detector near the sample surface using the detector with a −200 V entrance grid bias to enhance surface sensitivity. An electron charge compensation gun was used to eliminate charging effects. To eliminate the effect of incident beam intensity fluctuations and beamline optics absorption features, the PEY signals were normalized using the incident beam intensity obtained from the photo emission yield of a freshly evaporated Au grid with 90% transmittance placed along the path of the incident X-rays. A standard metallic vanadium reference mesh was used for energy calibration of the O K-edge spectra and a carbon mesh was used for energy calibration of the C K-edge spectra using the $\pi^*$ transition of graphite at 285.1 eV. Pre- and post-edge normalization of the data was performed using the Athena and Igor suite of programs.

Results and Discussion. Surface charges on lyophobic colloidal particles not only serve to prevent their agglomeration but also provide a means for manipulating and positioning them in 3D space and on substrates by the application of electric fields. The electrophoretic deposition of nanomaterials from organic and aqueous solutions by the application of DC fields has emerged as an attractive scalable, rapid, and inexpensive route for the fabrication of conformal nanostructured films. Compared to other nanomaterial assembly techniques such as spray-coating, filtration, and layer-by-layer assembly, electrophoretic deposition offers superior nanomaterial assembly rates, better packing of nanomaterial components (enhancing the robustness of the films), and significantly improved compatibility with lateral patterning. We report here the deposition of exfoliated graphene oxide and chemically derived reduced graphene films on ITO substrates by the application of DC electric fields to aqueous suspensions of the appropriate nanomaterials.

Previous research has shown that graphite oxide can undergo complete exfoliation in water owing to the disruption of interlayer coupling upon functionalization, yielding a suspension of graphene oxide sheets that can be reduced or further chemically functionalized. Graphene oxide sheets obtained by the ultrasonic exfoliation of graphite oxide yield a stable suspension in water because of electrostatic stabilization from polar and ionizable functional groups that impart a negative charge. FIG. 1 shows a plot of the ζ-potential distribution for exfoliated graphene oxide sheets in water indicating the strongly negative surface charge on these materials. The ζ-potential distribution is centered around −36 mV. Consistent with ideas of electrostatically mediated colloidal stability for particles with ζ-potentials above 30 mV or below −30 mV, the graphene oxide sheets form a solution that is stable over several months. These solutions are light brown in color suggesting the partial disruption of the conjugated $sp^2$-hybridized graphitic framework. FIG. 1 also shows the ζ-potential distribution of the KOH/hydrazine reduced graphene oxide sheets prepared using the method developed by Nguyen, Ruoff, and co-workers. The reduction of graphene oxide by hydrazine in the presence of KOH yields dark solutions indicating significant recovery of the conjugated network. This approach for reducing graphene oxide is especially attractive because of the retention of the dispersion of the resulting chemically derived graphene nanoplatelets in water without the addition of surfactants or polymers. The ζ-potential trace for this sample shows a very negative surface potential centered around −78 mV consistent with the increased ionization of species such as the carboxylic acid groups located at edge sites at high pH values. Notably, the hydrazine reduction protocol is expected to result in the deoxygenation of the epoxide species on the basal planes but is likely to leave the carboxylic acid groups at the edge sites intact, and thus the latter can help in electrostatically stabilizing the reduced graphene sheets at high pH. Potassium ions likely associate with the charged carboxylic acid groups at the edge sites to form carboxylate ion pairs. The conductivities of the graphene oxide solutions range from 0.1-0.5 mS/cm with the KOH solutions typically at the higher end of this range.

Figure 2:
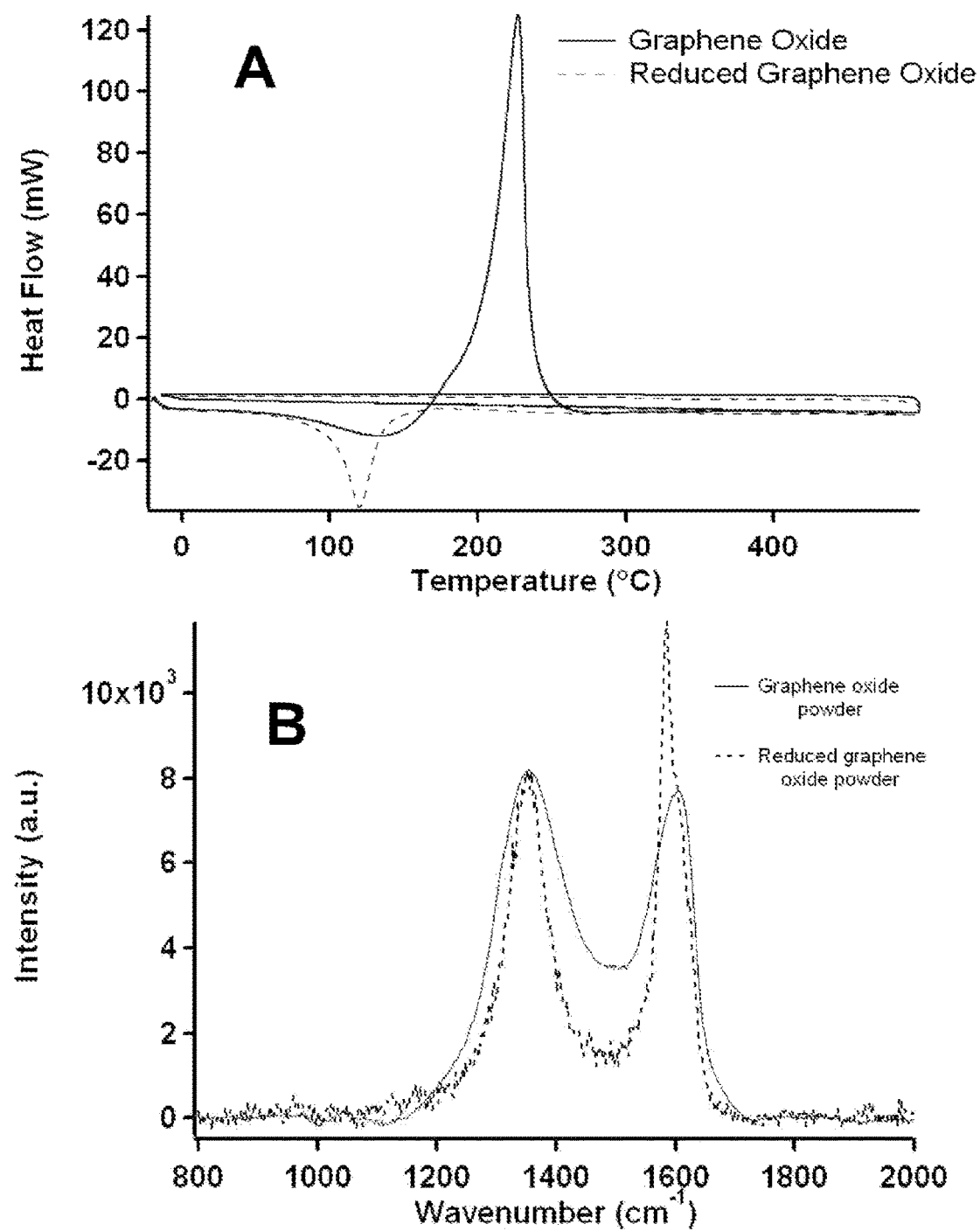
FIG. 2. A) DSC curves of graphene oxide and reduced graphene oxide powders; B) Raman spectra of the same two samples.

DSC traces have been obtained for exfoliated graphene oxide sheets and a control powder sample reduced by hydrazine. FIG. 2A compares the DSC plots for the graphene oxide and reduced graphene oxide samples. The DSC curve of graphene oxide exhibits an exothermic peak at 230° C., which can be attributed to the removal of oxygenated groups (primarily epoxide and hydroxyl groups on the basal plane) to form water, whereas the hydrazine-reduced sample shows only an endothermic peak at 118° C. attributable to the removal of physically adsorbed water from the reduced graphene oxide surface; the latter feature is also present for the graphene oxide sample. The DSC data thus clearly evidences the efficacy of hydrazine in defunctionalizing graphene oxide. FIG. 2B contrasts Raman spectra for graphene oxide and reduced graphene oxide powder samples. The spectra are characterized by two prominent peaks at 1340 and 1598 $cm^{-1}$, which correspond to the D and G modes, respectively. The G band corresponds to the first order scattering from the doubly degenerate $E_{2g}$ phonon modes of graphite at the Brillouin zone center and is characteristic of all $sp^2$-hybridized carbon networks; the dispersive D band arises from phonon branches within the interior of the graphite Brillouin zone that are activated by scattering from defects; the $I_D/I_G$ ratio provides a sensitive measure of the disorder and crystallite size of the graphitic layers. Additionally, another prominent second-order dispersive feature, the G' band, is observed at ~2690 $cm^{-1}$ and is thought to originate from a two-phonon double resonance process. The prominent D band observed in FIG. 2B for the graphite oxide powder arises from the increased defect density upon functionalization of the graphitic basal planes with hydroxyl and epoxide groups. Remarkably, upon reduction with hydrazine, the $I_D/I_G$ ratio very significantly decreases indicating considerable recovery of the conjugated graphitic framework upon defunctionalization of the epoxide and hydroxyl groups.

Digital images obtained by optical microscopy and scanning electron micrographs of graphene-based thin films prepared by the electrophoretic deposition of exfoliated graphene oxide and graphene oxide reduced by KOH/hydrazine onto ITO substrates range in color from a light to a dark brown depending on the thickness; the brown color is consistent with the smaller size of intact conjugated domains within graphene oxide. In contrast, after reduction with KOH and hydrazine, the obtained reduced graphene oxide suspensions are black in color and yield darker films upon electrophoretic deposition. The films used to obtain these images have been found to range in thickness from 9.6 to 146 nm by spectroscopic ellipsometry measurements. The optical constants n and k for these films from 300-900 nm have been determined. We observed considerably smoother films upon deposition in constant-current mode as compared to deposition wherein the applied voltage is kept constant. The voltage applied during electrophoretic deposition is typically <20 V. Spectroscopic ellipsometry results further indicate that the thickness of the films can be varied by adjusting the deposition time (1-20 min) although as observed with the electrophoretic deposition of other nanostructured materials, most of the functionalized graphene sheets are deposited within the first 5 min, likely corresponding to the deposition of the more extensively charged species that lie at the higher magnitude tails of the ζ-potential distribution in FIG. 1. Film thicknesses ranging from ~10-155 nm have been obtained and there appears to be a limiting thickness (<200 nm) beyond which deposition does not proceed any further. Notably, no extraneous chargers are added to the dispersions although the presence of some remnant metal ion species from the permanganate oxidation of graphite oxide can not be ruled out. Of course, reduced graphene oxide solutions prepared by the reduction of exfoliated graphene oxide by KOH and hydrazine have significant $K^+$ ion concentration ($K^+$ ions are also incorporated within the electrophoretic ally deposited films as discussed below) that enhance the conductivity of the solutions as noted above. The maximum thickness observed here is significantly less that the few micrometers typically obtained upon the electrophoretic deposition of other nanomaterials such as CdSe quantum dots or carbon nanotubes. The optical microscopy and SEM images indicate the deposition of uniform films over large areas without evidence for any significant cracking. For thicker films some crumpling of the chemically derived graphene sheets is observed at the boundaries between individual graphene platelets for electrophoretically deposited graphene oxide films. Films ranging in size up to 2.5 cm×2.5 cm have been fabricated by this versatile and scalable approach that is limited only by the size of the substrate and the deposition bath.

Figure 3:
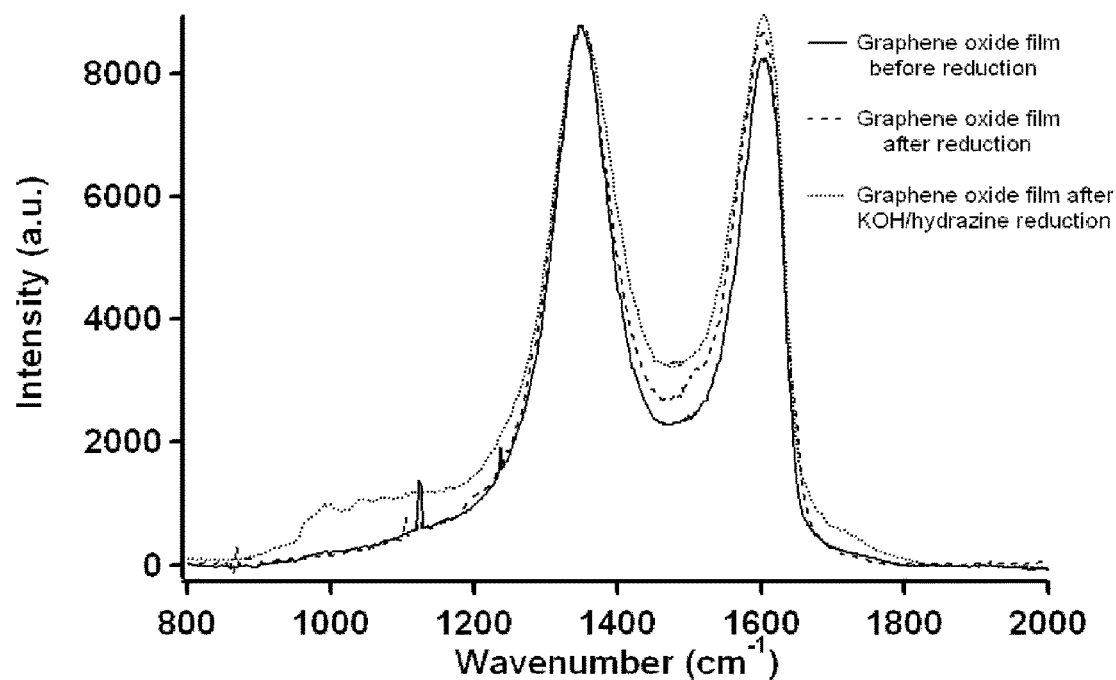
FIG. 3. Raman spectra for three distinct films: an as-deposited graphene oxide film; the same film after reduction by dip-coating in an aqueous solution of hydrazine; and an as-deposited KOH/hydrazine reduced graphene oxide film.

FIG. 3 shows Raman spectra acquired for three films: a) an as-deposited graphene oxide film; b) the same film after reduction by dip-coating in an aqueous solution of hydrazine; and c) an as-deposited KOH/hydrazine-reduced graphene oxide film. The spectra have been normalized to the intensity of the D band. It is clear that hydrazine reduction results in a diminution of the D-band intensity (seen as an increase in the relative intensity of the G band), suggesting partial recovery of the conjugated graphene structure as noted above. Consistent with its darker color, the $I_D/I_G$ intensity is the smallest for the KOH/hydrazine-reduced graphene oxide film, confirming substantial recovery of conjugated graphene domains. The difference between this film and the film reduced by dip coating in a hydrazine solution may also be that for the latter film, reduction upon dip-coating in hydrazine solution occurs primarily for the surface layers and that the underlying layers remain substantially oxidized.

While electron microscopy provides some indication of the alignment and uniformity of the chemically derived graphene components within the electrophoretic ally deposited films, it is not a good probe of the local structure and alignment (local "flatness") of the individual graphene components. Polarized NEXAFS spectroscopy provides detailed insight into the warping or alignment of the chemically derived graphene components of the films and thus a systematic angle-resolved NEXAFS study has been performed to simultaneously evaluate the electronic structure, surface chemistry, and degree of alignment of these nanostructured materials. As noted above, the alignment of individual graphene nanosheets within the films is likely to strong influence the transport properties, mechanical robustness, and resistance to sloughing for these films. In contrast to previous measurements of related graphene structures, we present the first systematic angle-resolved NEXAFS measurements of chemically derived graphene films. Previous measurements have been performed on bulk (unexfoliated) graphite oxide or graphene sheets obtained by micromechanical cleavage and have been limited to single incident angles, precluding the evaluation of alignment and symmetry in these materials.

Figure 4:
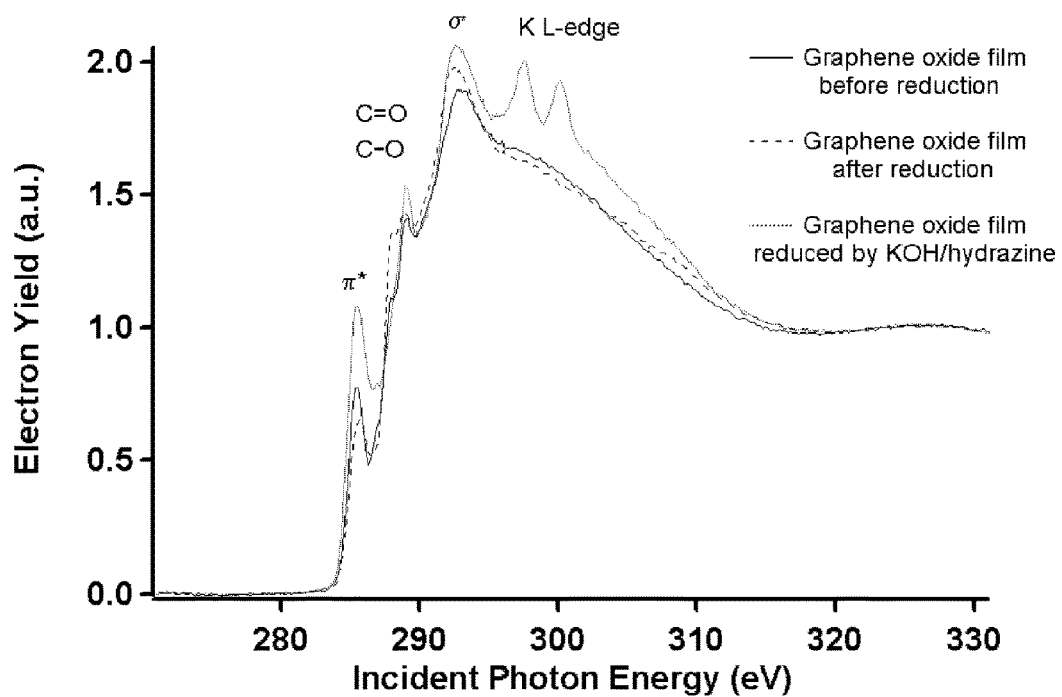
FIG. 4. Magic angle (54.7° incidence) C K-Edge NEXAFS spectra for three separate films: an as-deposited graphene oxide film; the same film after reduction by dip-coating in an aqueous solution of hydrazine; and an as-deposited KOH/hydrazine-reduced graphene film.

FIG. 4 contrasts the C K-edge NEXAFS spectra acquired for the three films noted above at magic angle (54.7°) incidence where the peak intensities are expected to be independent of the angular asymmetry dependences of the transition matrix elements. C K-edge NEXAFS spectra correspond to the excitation of C 1s core electrons to unoccupied and partially filled levels in the conduction bands of graphitic systems, and thus to a good approximation reflect the unoccupied density of states (UDOS) above the Fermi level for these materials (as modified by core-hole effects). Band-theory-based descriptions of NEXAFS spectra with spectral features ascribed to transitions to all possible unoccupied one-electron states are in good agreement with electronic structure calculations for graphite and other extended $sp^2$-hybridized systems such as carbon nanotubes. The lowest energy peak closest to the Fermi level at ~285.5 eV (labeled as the $\pi^*$ resonance in FIG. 4) can be attributed to transitions to states of $\pi$ symmetry around the M and L points of the graphene Brillouin zone. The sharply structured peak at ~292.55 eV is thought to have some excitonic character and arises from transitions to dispersionless unoccupied states possessing a symmetry at the $\Gamma$ point of the graphene Brillouin zone. Of note in the C K-edge spectra in FIG. 4 is the increase in the intensity of the $\pi^*$ resonance for the KOH/hydrazine-reduced graphene films compared to the graphene oxide films before and after reduction, suggesting that the restoration of the $sp^2$-hybridized carbon network is better achieved by reduction prior to electrophoretic deposition. The higher energy features above 292.5 eV arise from higher lying conduction states of $\pi$ and $\sigma$ symmetry in the graphite/graphene DOS. Notably, these features are significantly less defined in the graphene samples studied here as compared to HOPG samples, consistent with the notion that even though interlayer coupling in graphite is fairly weak, the graphite band structure shows some clear differences from that of few layered graphene. In other words, the reduced interlayer coupling in the electrophoretically deposited graphene films likely leads to the smearing and decrease in intensity of the higher energy features. Such behavior is also consistent with a multiple scattering view of NEXAFS spectra wherein the excited electron wave function is thought to be scattered by adjacent atoms. The lack of atoms in the immediate vicinity above and below the graphene basal plane due to increased interlayer separation thus reduces the cage of scattering atoms around the excited atom leading to a diminished intensity for these features. The KOH/hydrazine-reduced graphene sample shows two additional distinctive features at ~297.5 and 300.2 eV arising from transitions to $2_{P3/2}$ and $2_{P1/2}$ states, respectively, at the K L-edge, indicating the incorporation of $K^+$ ions in the electrophoretically deposited films. The K L-edge peaks are shifted by ~3 eV from literature values of 294.6 eV and 297.3 eV reported for potassium L edges. Such shifts have been attributed to the formation of strongly ionic potassium-functional-group interactions such as the potassium-ion-carboxylate bonds expected for the KOH/hydrazine-reduced graphene samples. This observation confirms the formation of ion pairs upon reduction of graphene oxide by hydrazine in a strongly alkaline KOH solution. The graphene oxide film before reduction also shows two well-resolved spectral features at ~287.9 and 289.1 e V between the $\pi^*$ and $\sigma^*$ resonances along with a shoulder at 286.9 eV. The narrow and sharply structured 289.1 eV feature can be attributed to transitions to $\pi^*$ C=O states derived from edge carboxylic acid groups based on previous studies of graphite oxide and molecular building blocks such as amino acids. Indeed, Jeong et al. have attributed a feature at 288.9 eV in unexfoliated graphite oxide prepared by Brodie's method to such carboxylic acid moieties. Analogously, the broad shoulder at ~286.9 eV can be attributed to transitions from C 1s core levels to $\pi^*$ C—OH states derived from basal phenolic groups of graphene oxide based on literature innershell absorption spectra of phenol, phthalic acid, and pyrocatechol. The relatively broad peak at ~287.9 eV may represent a convolution of transitions to c-o states derived from epoxide moieties (a feature at ~287.2 eV observed for graphite oxide has been thus attributed by Jeong et al.) and intrinsic interlayer states in the conduction band of graphitic systems (a feature at ~288 eV observed for graphene obtained by micromechanical cleavage has been thus attributed by Pacile et al.) The well-defined $\pi$ symmetry of the C=O bonds give rise to a narrowly structured peak; in contrast, the C—O peaks are more weakly structured although they contribute greater spectral weight and integrated intensity corresponding to their higher concentration on the graphene basal planes. The interlayer state is derived from a 3D conduction band feature with charge density predominantly concentrated between the basal planes and has been the subject of extensive theoretical and experimental study over the last two decades. The interlayer states with free-electron character lie in the interior of the graphite/graphene Brillouin zone and have been shown to exhibit almost dispersionless behavior at the $\Gamma$ point about 5 eV above the graphite Fermi level. Such states are predicted to exist even for single-layered graphene, as has recently been demonstrated by Pacile et al. in photo emission electron microscopy (PEEM) experiments of micromechanically cleaved samples. These states contain contributions from $p_x$, $p_y$, and $p_z$ orbitals and thus display neither $\pi$ nor $\sigma$ symmetry. Notably, however we do not observe a shoulder to the $\pi^*$ resonance at 283.7 eV proposed by these authors to be a characteristic signature of the UDOS of single and bilayered graphene. There are two likely reasons for the absence of this feature in our high-resolution C K-edge NEXAFS spectra. It is possible that the electrophoretically deposited films still have enough interlayer coupling to modify the electronic structure along the high-symmetry direction so that transitions to characteristic graphene states are not observed. Notably, this feature is not observed even for few layered graphene thicker than two graphene layers. Secondly, functionalization especially on the basal planes may also serve to sufficiently modify the band structure of graphene by disrupting the extended conjugated network. Detailed theoretical calculations are required to address the role of functionalization in modifying the electronic structure of graphene but based on the diminished mobilities observed in transport measurements perhaps it should not be surprising that chemically derived graphene differs at least in some subtle details of the band structure from pristine graphene. For the KOH/hydrazine-reduced graphene films, the feature at 287.9 eV is far less prominent, consistent with the defunctionalization of epoxide and hydroxyl groups upon treatment with hydrazine; in contrast, the 288.9 eV resonance ascribed to transitions to π* C=O states derived from carboxylate moieties at edge sites is retained in all the samples, which agrees well with the reported inertness of —COOH groups to defunctionalization by hydrazine.

Figure 5:
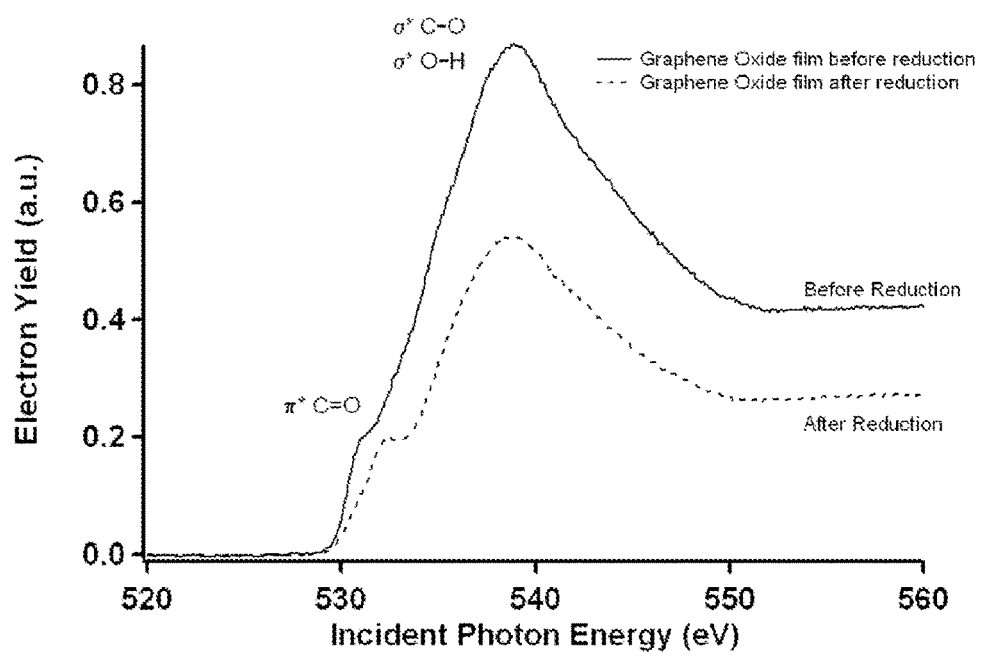
FIG. 5. Magic angle O K-edge NEXAFS spectra for an as-deposited graphene oxide film and the same film after reduction by dip-coating in an aqueous solution of hydrazine.

Further evidence for the role of hydrazine in defunctionalizing the basal epoxide and hydroxyl groups of graphene oxide is provided by the O K-edge NEXAFS spectra shown in FIG. 5. The spectra in this figure have only been pre-edge normalized to demonstrate the difference in the edge jump heights of the graphene oxide films before and after hydrazine reduction. The pre-edge normalized intensities beyond 550 eV are reflective of the relative oxygen concentrations in the samples. FIG. 5 clearly demonstrates the loss of oxygenated functional groups upon hydrazine reduction of the graphene oxide films. Two distinctive features are observed at the O K-edge: a weaker feature at ~531 eV and a convolution of several peaks centered around 537 eV. The former can be ascribed to transitions from O 1s core levels to π* C=O states derived from the carboxylic acid groups at the graphene oxide edge sites. The higher energy components of the asymmetric and weakly structured feature centered at 537 eV observed for graphene oxide films both before and after reduction undoubtedly arise from transitions to O—H and C—O σ* states derived from basal phenolic groups that have been reported at 535.4 and 539.7 eV, respectively, in O K-edge NEXAFS studies of graphite oxide. The lower energy component of this broad asymmetric peak can be ascribed to transitions to antibonding C—O σ* states derived from the abundant epoxide groups on the graphene oxide basal planes, consistent with the assignment of a 533.6 eV peak to epoxide species by Jeong et al for graphite oxide. Remarkably, after hydrazine reduction, it is clearly apparent that the diminution in intensity at the O K-edge comes largely at the expense of the higher energy σ* features and that the C=O π* spectral feature originating from carboxylic acid groups at edge sites is largely unaffected, which further corroborates the role of hydrazine in reacting primarily with the epoxide and phenolic moieties on the graphene basal plane.

Figure 6:
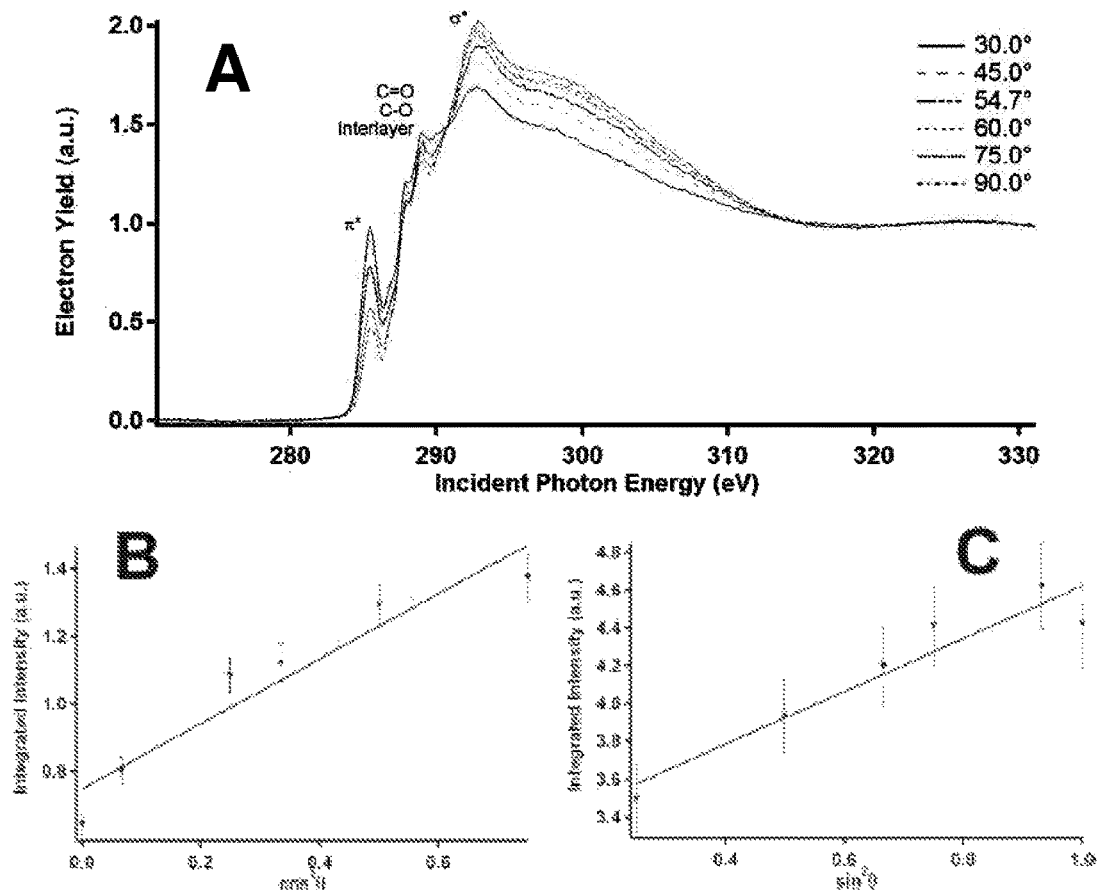
FIG. 6. A) Polarized C K-edge spectra for an as-deposited graphene oxide film before hydrazine treatment; all spectra have been pre- and post-edge normalized; B) Integrated intensity of the $\pi^*$ resonance versus the angle of incidence; the solid line shows the $\cos^2\theta$ dependence of the $\pi^*$ intensities; C) Integrated intensity of the $\sigma^*$ resonance versus the angle of incidence; the solid line shows the $\sin^2\theta$ dependence of the $\sigma^*$ intensities.

FIG. 6 shows polarized C K-edge NEXAFS spectra acquired for the electrophoretically deposited graphene oxide film prior to reduction. NEXAFS spectra not only reflect the UDOS of graphene as noted above but the transition matrix elements between the initial and final states are also incredibly sensitive to the polarization of the incident X-rays. When the polarization vector E is aligned along the bond axis, frontier orbital states with σ symmetry are probed, whereas when E is perpendicular to the intermolecular bond axis, states with π symmetry are selectively observed. In other words, the NEXAFS dipole selection rules give rise to a "searchlight effect" wherein different partially filled or empty states above the Fermi level are observed depending on their symmetry and spatial orientation by varying the angle of incidence of the linearly polarized incident X-rays. In recent work NEXAFS spectroscopy has been used to evidence the order and alignment of carbon nanotube arrays and films with considerable surface sensitivity. The polarized NEXAFS spectra of the electrophoretically deposited graphene oxide films in FIG. 6 clearly evidence considerable dichroism. At normal incidence (θ=90°), E is in the plane of the electrophoretically deposited films and dipole selection rules only allow transitions to states with θ symmetry. Indeed, the π* resonance at 285.45 eV is found to be significantly attenuated at normal incidence with the remnant intensity suggestive of some misalignment of graphene oxide nanoplatelets within the films and also perhaps the warping or 3D crumpling of individual graphene oxide sheets. Conversely, for 30° incidence of the linearly polarized X-rays, E has a significant component perpendicular to the plane of the film (along the π cloud) and indeed the π* resonance shows the strongest relative intensity with the σ* resonance most attenuated in intensity at this angle. FIGS. 6B and C plot the integrated intensity of the π* and σ* resonances versus the angle of incidence. The assigned symmetries of the two resonances are further corroborated by the good fits to cosine-squared and sine-squared functions as shown in the figures. Consistent with the assignment to π* C=O states derived from carboxylic acid groups noted above, the 288.9 eV peak increases in intensity with decreasing angle of incidence, tracking the behavior of the graphitic π* resonance. In contrast, the 287.8 eV feature thought to be derived from interlayer states with additional contributions from epoxide moieties does not show a strong polarization dependence, which is consistent with the interlayer states possessing neither σ nor π symmetry.

It is useful to define a dichroic ratio (DR) as a quantitative measure of the extent of alignment of graphene sheets within the electrophoretically deposited films.

$$DR = \frac{(I_\perp - I_\parallel)}{(I_\perp + I_\parallel)} \quad (1)$$

where $I_\perp$ is the integrated intensity of the π* resonance at θ=90° and $I_\parallel$ is the extrapolate of the integrated intensity at θ=0° obtained from the fitted cosine curves. A DR value of 0 is expected for a sample with completely random alignment of components (such as a completely amorphous polymer) and a DR value of −1 is expected for a perfectly aligned sample. A DR value of −0.45±0.08 has been deduced for the graphene oxide film prior to reduction. As comparison, a freshly cleaved HOPG sample has been shown to have a DR value of −0.90, whereas freestanding carbon nanotube films ("buckypaper") and vertically aligned carbon nanotube arrays have been shown to exhibit DR values ranging from −0.10 to +0.14 depending on their orientation with respect to the substrate. Thus, the as-deposited graphene oxide films clearly exhibit substantial alignment along the plane of the substrate.

Figure 7:
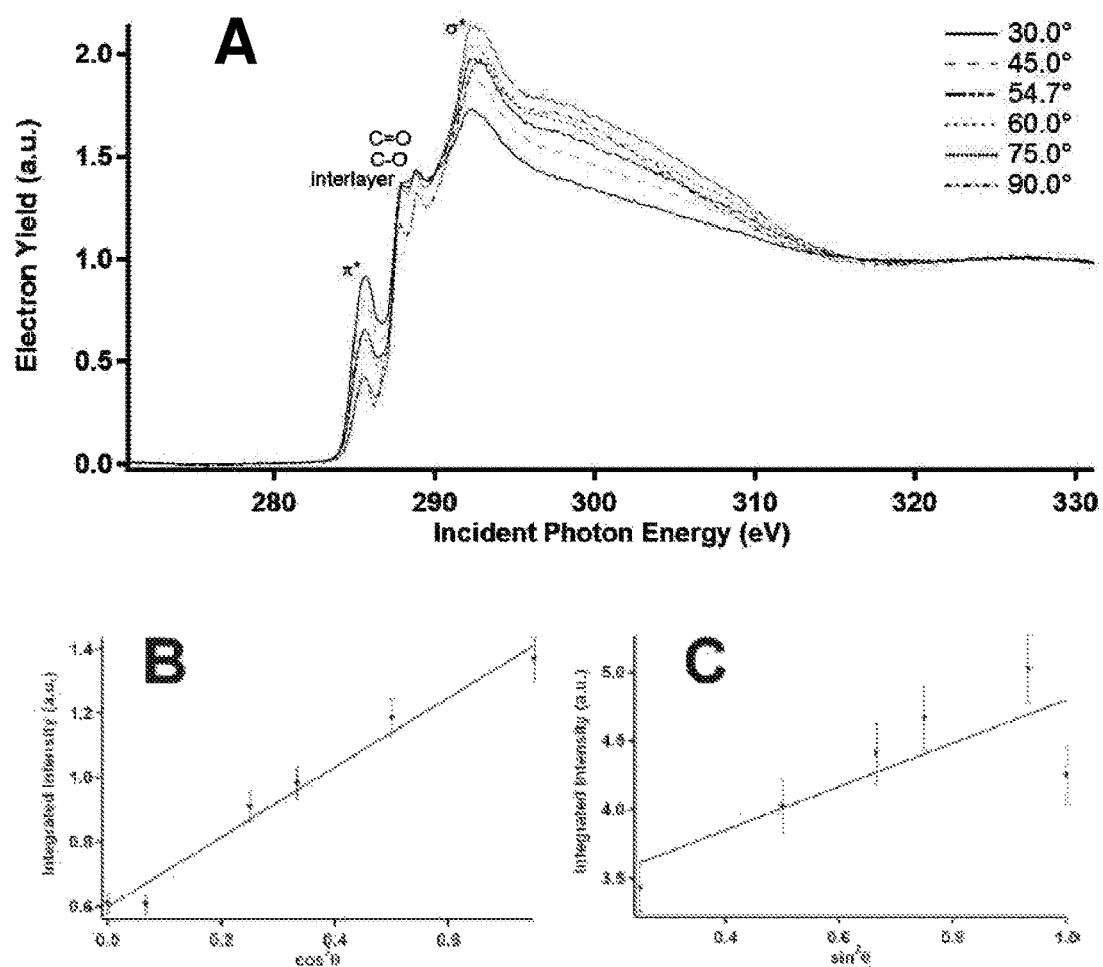
FIG. 7. A) Polarized C K-edge spectra for an as-deposited graphene oxide film after hydrazine treatment; B) Integrated intensity of the $\pi^*$ resonance versus the angle of incidence; the solid line shows the $\cos^2\theta$ dependence of the $\pi^*$ intensities; C) Integrated intensity of the $\sigma^*$ resonance versus the angle of incidence; the solid line shows the $\sin^2\theta$ dependence of the $\sigma^*$ intensities.

Upon reduction with hydrazine, the dichroism evidenced in the C K-edge spectra marginally increases for the graphene oxide film. FIG. 7 shows polarized NEXAFS spectra acquired for the graphene oxide film presented in FIG. 6 after dip coating in a solution of hydrazine hydrate. Upon reduction, the π* DR increases in absolute value to −0.47±0.08, which suggests somewhat increased ordering at least at the surface of the reduced graphene oxide film. The restoration of conjugated graphene domains upon reduction likely leads to marginally better stacking of graphene nanoplatelets within the electrophoretically deposited films yielding a slightly higher DR value. The removal of basal epoxide groups also likely paves the way for stronger π-π interactions and the underlying layers can thus play a greater role in improving the stacking of graphene platelets.

Figure 8:
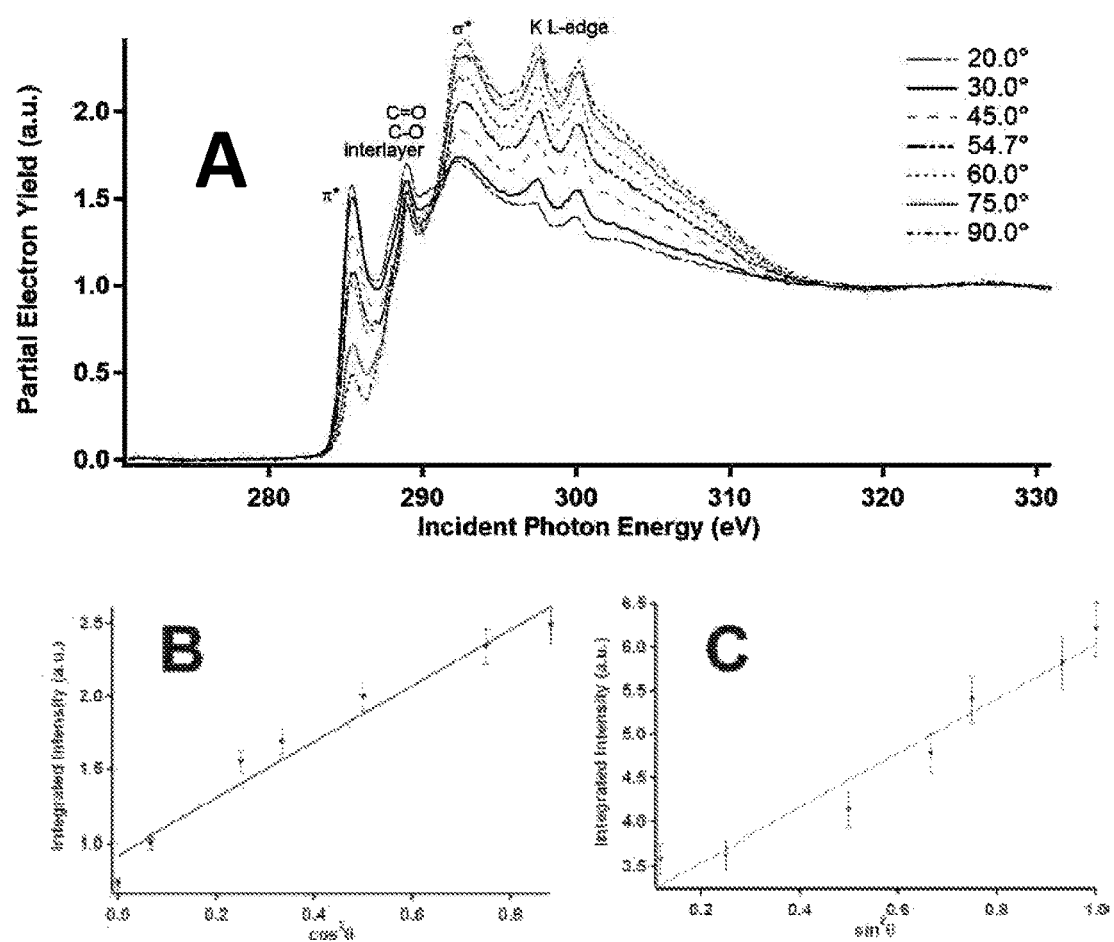
FIG. 8. A) Polarized C K-edge spectra for an as-deposited KOH/hydrazine reduced graphene film; B) Integrated intensity of the $\pi^*$ resonance versus the angle of incidence; C) Integrated intensity of the $\sigma^*$ resonance versus the angle of incidence.

FIG. 8 shows polarized C K-edge NEXAFS spectra acquired for a reduced graphene film fabricated by the electrophoretic deposition of KOH/hydrazine-reduced graphene oxide. The darker color, decreased $I_D/I_G$ band intensity observed in the Raman spectra (FIG. 3), and magic angle C K-edge data point to much greater restoration of the conjugated graphene domains upon reduction of graphene oxide prior to deposition. Consistent with these observations, FIG. 8 clearly shows much greater dichroism in the C K-edge NEXAFS spectra as compared to the spectra for electrophoretically deposited graphene oxide or post-deposition-reduced graphene oxide films. The π* DR calculated for this film is −0.59±0.08 corroborating that reduction in aqueous solution prior to deposition yields smoother and better aligned films as compared to the reduction of electrophoretically deposited graphene oxide films. Table 1 summarizes the dichroic ratios of the three films studied here. A likely scenario that emerges from this data is that graphene oxide reduced in strongly alkaline solutions retains extended conjugated $sp^2$-hybridized domains with carboxylic acid groups (and potassium-ion-carboxylate ion pairs) at edge sites enabling aqueous dispersibility as a result of electrostatic interactions. These largely intact and rigid domains are attracted by the electric field and travel to the electrodes where they transfer charge and are deposited on the electrode surface. The rigidity of the domains and ability to stabilize subsequent layers by π-π interactions results in relatively less warping/crumpling of the deposited chemically derived graphene sheets. The remnant misalignment is likely at the interface between graphene sheets on the same plane.

TABLE 1

Dichroic ratio calculated from the polarized NEXAFS spectra for three separate films (Equation 1): an as-deposited graphene oxide film; the same film after reduction by dip-coating in an aqueous solution of hydrazine; and an as-deposited KOH/hydrazine-reduced graphene film.

| Film Type | Dichroic Ratio |
| --- | --- |
| KOH/hydrazine reduced film | −0.59 ± 0.08 |
| Graphene oxide before hydrazine reduction | −0.45 ± 0.08 |
| Graphene oxide after hydrazine reduction | −0.47 ± 0.08 |

Therefore we have demonstrated a facile, fully scalable, and rapid method for the fabrication of large-area conformal graphene films on conductive substrates based on the electrophoretic deposition of chemically derived graphene oxide and reduced graphene oxide nanoplatelets onto conductive substrates. Polarized soft X-ray absorption spectroscopy measurements enable identification of surface functional groups, changes in the graphene band structure, and allow evaluation of the alignment and rigidity/warping of the graphene sheets within the deposited films. These measurements indicate that reduction with hydrazine prior to electrophoretic deposition yields smoother and better aligned films as compared to the post-deposition reduction of electrophoretically deposited graphene oxide films. The large-area conformal graphene films reported here represent attractive candidates for ultracapacitors, field-emitting displays, and tunable coatings. Recent advances in display technologies and the increasing demand for large-area solar panels have resulted in a global scarcity of conventional transparent conducting oxide materials. In particular, the limited natural abundance and constantly surging price of indium has lead to an intensive worldwide search for cheaper conducting and transparent alternatives. If graphene can be processed from solution to form conducting films exhibiting only a thousandth of the theoretically predicted and experimentally observed mobility values measured for micromechanically cleaved samples, viable and competitive alternatives to graphene can be realized. Furthermore, graphene films are likely to afford better flexibility and will thus also serve the burgeoning need for highly conducting materials for plastic electronics. The graphene films prepared by our novel methodology not only benefit from the above advantages but can also be patterned with submicrometer resolution, overcoming a formidable challenge that remains to be adequately resolved for competing ITO technologies. Finally, the excellent conformability and low surface roughness of our materials will be of paramount importance for flexible electronics applications and will provide a critical edge over competing carbon-nanotube based technologies.

Digital images were obtained for six distinct films: (a) graphene oxide film reduced by dipping in liquid hydrazine; (b) graphene oxide film reduced by dipping in liquid phenylhydrazine; (c) graphene oxide film reduced by dipping into 0.5 M aqueous $NaBH_4$; (d) graphene oxide film reduced by dipping into 3.4 mM aqueous hydrazine; (e) graphene oxide film reduced by vapor phenylhydrazine under vacuum; (f) graphene oxide film with no reduction. The graphene oxide film displays a light brown color before reduction, consistent with the color seen in the electrophoretic ally deposited GO films before hydrazine reduction. This suggests a partial disruption of the conjugated $sp^2$-hybridized graphitic framework. In contrast, after reduction through the various methods, the films are much darker which suggests a significant restoration of the $sp^2$-hybridized graphitic framework., some warping and cracking is observed on the surface of these films during the reduction process. The milder aqueous hydrazine treatment displays a smooth, partially reduced surface while the stronger reducing agents show a much darker, cracked surface suggesting that the milder treatment may preserve alignment within these films while the stronger reducing agents are better at removing functional groups introduced by Hummer's method. Defunctionalization of the graphene disrupts some interactions (such as hydrogen bonding) within the films and the resultant escape of trapped solvent molecules leads to contraction in the film volume, which generates train gradients and eventually leads to delamination. This is observed in optical microscopy images as cracking of the film.

Figure 9:
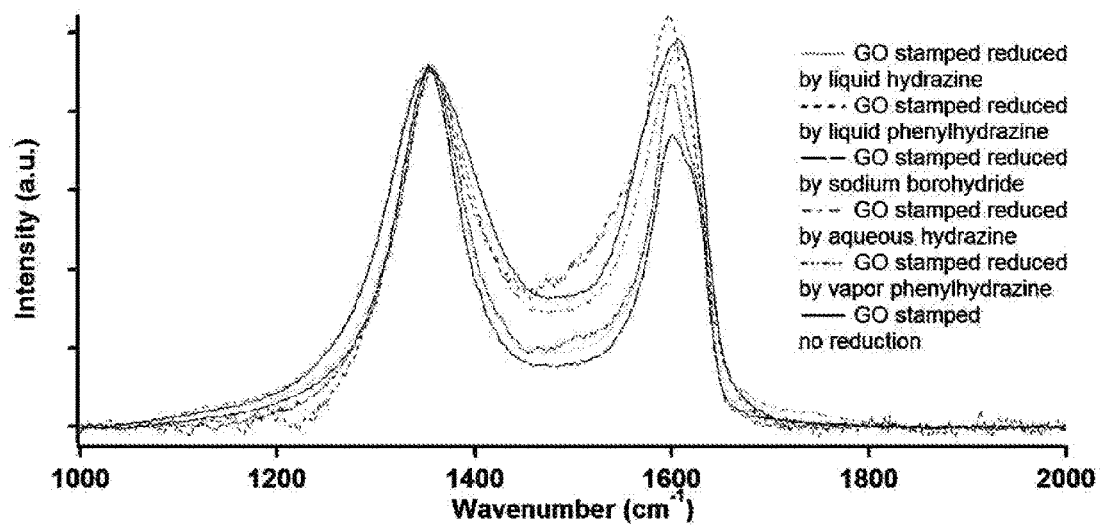
FIG. 9. Raman spectra of six distinct films: (a) graphene oxide film reduced by dipping in liquid hydrazine; (b) graphene oxide film reduced by dipping in liquid phenylhydrazine; (c) graphene oxide film reduced by dipping into 0.5 M aqueous $NaBH_4$; (d) graphene oxide film reduced by dipping into 3.4 mM aqueous hydrazine; (e) graphene oxide film reduced by vapor phenylhydrazine under vacuum; (f) graphene oxide film with no reduction.

FIG. 9 contrasts the Raman spectra acquired for the six distinct films: (a) graphene oxide film reduced by dipping in liquid hydrazine; (b) graphene oxide film reduced by dipping in liquid phenylhydrazine; (c) graphene oxide film reduced by dipping into 0.5M aqueous $NaBH_4$; (d) graphene oxide film reduced by dipping into 3.4 mM aqueous hydrazine; (e) graphene oxide film reduced by vapor phenylhydrazine under vacuum; (f) graphene oxide film with no reduction. The spectra display two prominent peaks at ~1353 and 1600 cm-1, which corresponds to the D and G modes, respectively. The G mode corresponds to the first-order scattering of the $E_{2g}$ mode in the graphite Brillouin zone. The D mode arises from the scattering from defects in the graphite Brillouin zone. The $I_D/I_G$ ratio can be used to probe the disorder and crystallite size of graphitic layers. Two distinctive factors contribute to the intensity of the $I_D$ disordered mode and thus to the relative $I_D/I_G$ ratio. Functional groups present as defects on the graphene sidewalls can enhance the $I_D$ intensity. However, upon defunctionalization, cleavage of graphene platelets into smaller domains can occur, which can further enhance the intensity if the $I_D$ feature. However if defunctionalization truly involves "healing" of functionalized sites with the recovery of C—C bonds, a decrease in the $I_D$ intensity is expected. Table 2 summarizes the $I_D/I_G$ ratio for all the graphene oxide and reduced graphene oxide films. The $I_D/I_G$ ratio increase for most of the reducing agents when compared to the original GO film. This suggests that smaller graphitic domains are made as the reduction is complete.

TABLE 2

Comparison of the $I_D/I_G$ ratio for the six distinct films.

| Reducing Agent | $I_D/I_G$ |
|---|---|
| Liquid hydrazine | 1.24 |
| Liquid phenylhydrazine | 0.88 |
| Sodium borohydride | 1.24 |
| Aqueous hydrazine | 0.94 |
| Vapor phenylhydrazine | 1.05 |
| No reducing agent | 0.93 |

Figure 10:
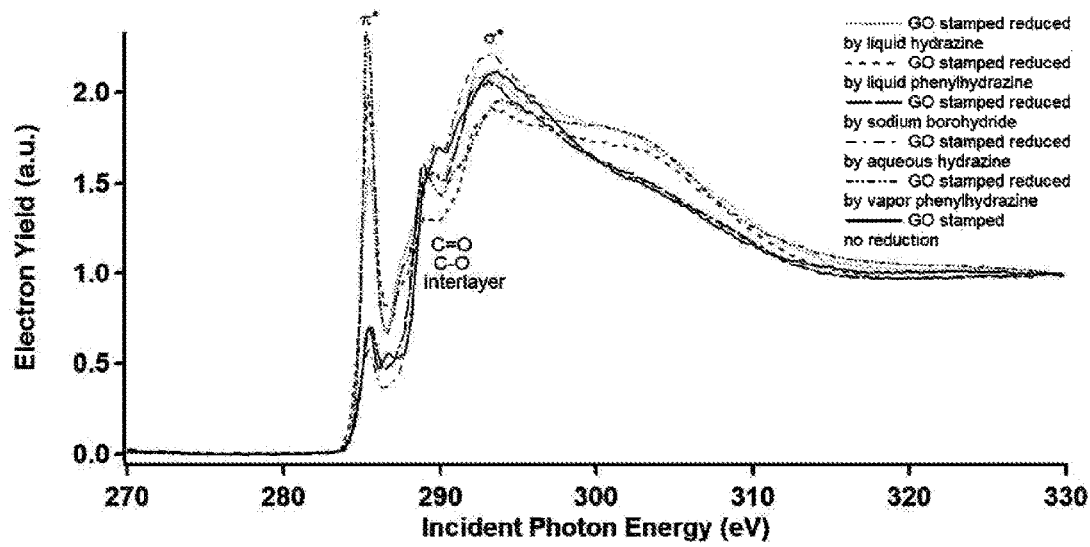
FIG. 10. Magic angle (54.7° incidence) C K-edge NEXAFS spectra for six distinct films: (a) graphene oxide film reduced by dipping in liquid hydrazine; (b) graphene oxide film reduced by dipping in liquid phenylhydrazine; (c) graphene oxide film reduced by dipping into 0.5 M aqueous sodium borohydride; (d) graphene oxide film reduced by dipping into 3.4 mM aqueous hydrazine; (e) graphene oxide film reduced by vapor phenylhydrazine under vacuum; (f) graphene oxide film with no reduction.

FIG. 10 contrasts the C K-edge NEXAFS spectra acquired for the six films mentioned above at magic angle (54.7°) incidence where the peak intensities are independent of their angular symmetry dependence. The lowest energy peak closest to the Fermi level at ~285.3 eV (labeled π*) can be assigned to the transition of C 1s core level electrons into states of it symmetry. The higher energy sharp peak at ~293.0 eV (labeled σ*) can be attributed to the excitation of C 1s core level electrons into states of σ symmetry. Two additional spectral features at ~289.0 and ~289.7 eV between the π* and σ* along with a shoulder at ~287.5 eV are also visible. The feature at ~289.7 can be attributed to the π* symmetry of the C=O bonds while the peak at ~289.0 arising from a convolution of the C—O bond derived from epoxide groups. The shoulder at ~287.5 eV can be attributed to the π symmetry of the C—OH bonds derived from basal phenolic groups. Furthermore a peak at ~286.7 eV seen in the graphene oxide film before reduction can be attributed to the transition of C 1s core level electrons to C—O states derived from epoxide groups on the basal plane of graphene oxide. This peak is no longer visible after reduction, suggesting all the reduction methods are adept at removing the epoxide group during reduction. Another feature of the spectra is the intensity of the π* is highest for the pure phenylhydrazine and hydrazine reduced GO sample suggesting they are the best reducing agents for restoration of the conjugated $sp^2$-hybridized graphitic framework. Analogously, they are also the best reducing agents for removal of functional groups as seen from the intensity of the ~289.7 eV transition.

Figure 11:
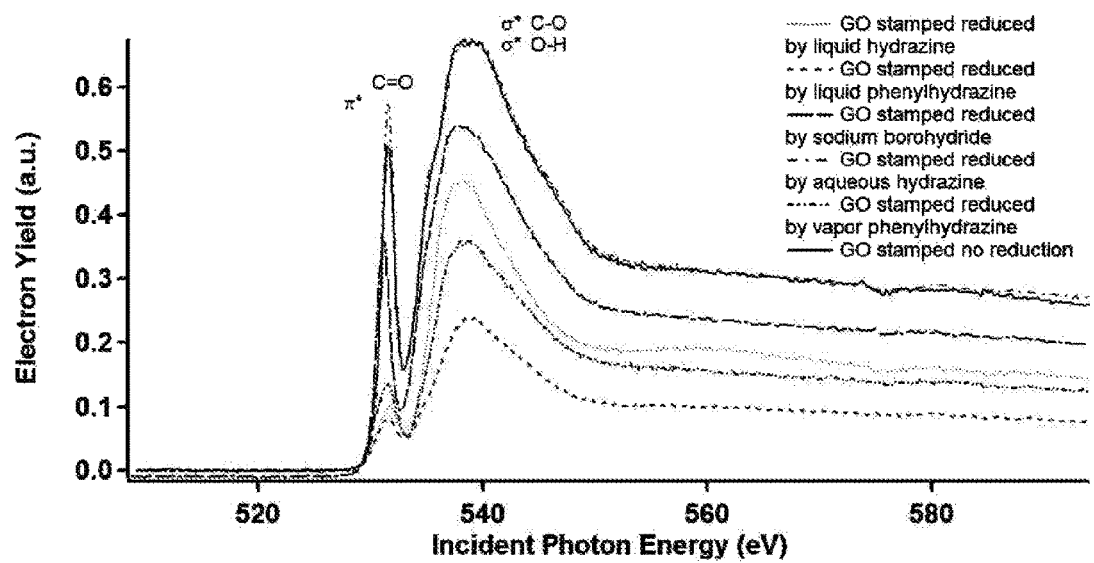
FIG. 11. Magic angle O K-edge NEXAFS spectra for six distinct films: (a) graphene oxide film reduced by dipping in liquid hydrazine; (b) graphene oxide film reduced by dipping in liquid phenylhydrazine; (c) graphene oxide film reduced by dipping into 0.5 M aqueous sodium borohydride; (d) graphene oxide film reduced by dipping into 3.4 mM aqueous hydrazine; (e) graphene oxide film reduced by vapor phenylhydrazine under vacuum; (f) graphene oxide film with no reduction.

Further evidence for this trend is seen in the O K-edge NEXAFS spectra shown in FIG. 11. The spectra has only been pre-edge normalized to compare the relative edge jump heights of the GO and reduced GO films. The intensities beyond 555 eV are reflective of the relative oxygen concentrations in each sample. The lowest concentrations of oxygen are found for pure phenylhydrazine and hydrazine, further suggesting their efficacy at defunctionalizing GO, and inducing restoration of the $sp^2$-hybridized graphitic framework. Two additional features at ~531.5 and ~538 eV can be observed. The feature at ~531.5 eV can be attributed to transitions from O 1s core level electrons to π* C=O states derived from carboxylic acid groups at the GO edge sites.[30,34] The feature at ~538 eV can be attributed to several transitions including the O 1s core level electrons to O—H and C—O states of σ* symmetry. Notably, the intensities of both transitions are affected by the defunctionalization process.

Figure 13:
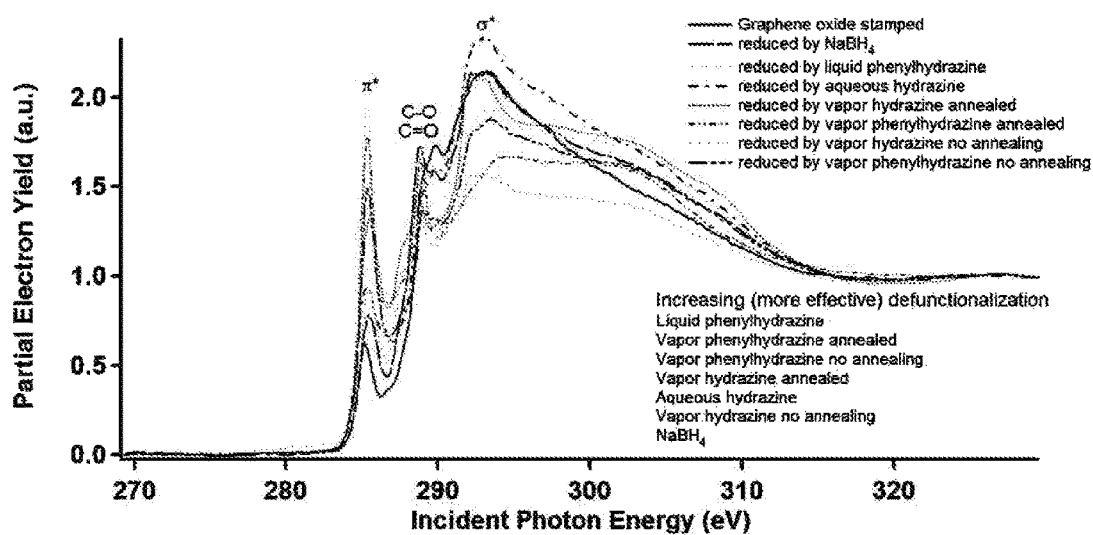
FIG. 13. Magic angle (54.7° incidence) C K-edge NEXAFS spectra for eight distinct films: (a) graphene oxide film with no reduction; (b) graphene oxide film reduced by NaBH4; (c) graphene oxide film reduced by dipping into liquid phenylhydrazine; (d) graphene oxide film reduced by dipping into 3.4 mM aqueous hydrazine; (e) graphene oxide film reduced by vapor hydrazine under vacuum followed by an anneal; (f) graphene oxide film reduced by vapor phenylhydrazine under vacuum followed by an anneal; (g) graphene oxide film reduced by vapor hydrazine under vacuum with no annealing; (h) graphene oxide film reduced by vapor phenylhydrazine under vacuum followed with no annealing.
Figure 14:
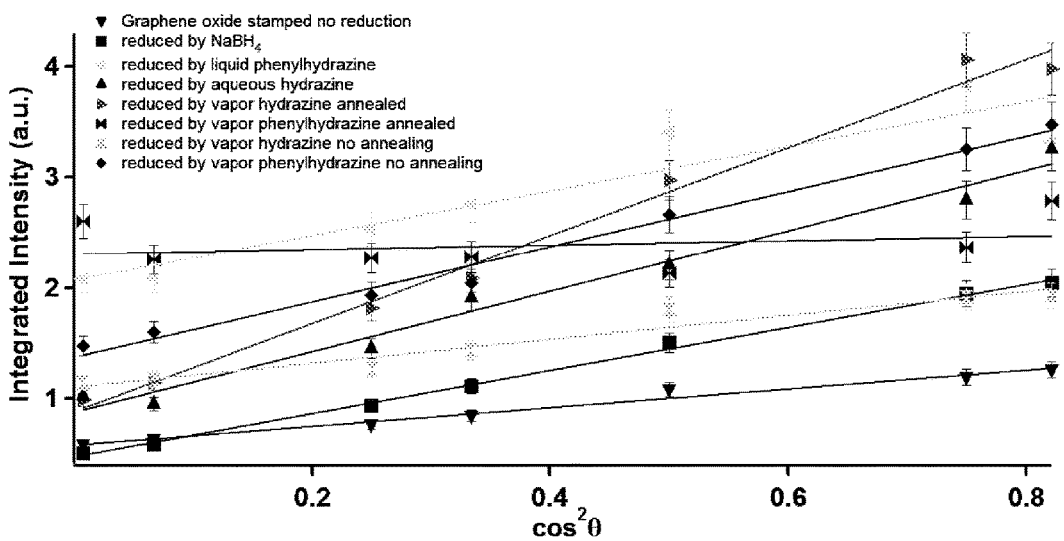
FIG. 14. Integrated intensity of the $\pi^*$ resonance versus the angle of incidence for eight distinct films: (a) graphene oxide film with no reduction; (b) graphene oxide film reduced by $NaBH_4$; (c) graphene oxide film reduced by dipping into liquid phenylhydrazine; (d) graphene oxide film reduced by dipping into 3.4 mM aqueous hydrazine; (e) graphene oxide film reduced by vapor hydrazine under vacuum followed by an anneal; (f) graphene oxide film reduced by vapor phenylhydrazine under vacuum followed by an anneal; (g) graphene oxide film reduced by vapor hydrazine under vacuum with no annealing; (h) graphene oxide film reduced by vapor phenylhydrazine under vacuum followed with no annealing.
Figure 15:
FIG. 15. Schematic depicting the solution synthesis of reduced graphene oxide starting from graphite oxide.

FIG. 13 shows polarized C K-edge NEXAFS spectra acquired for the GO film with no reduction. Due to the dipole selection rules governing NEXAFS, varying the angle of linearly polarized X-rays incident upon the sample allows for probing of states with different symmetry. At normal incidence, the polarization vector E is aligned along the intermolecular bond axis, probing states of σ symmetry. At glancing incidence, E is perpendicular to the intermolecular bond axis, probing states of π* symmetry. By following the relative intensity of the π* transition at ~285.3 eV at different angles, the extent of alignment of individual graphene platelets within the graphene film can be determined. The dichroic ratio (DR), defined as $$DR = \frac{(I_\perp - I_\|)}{(I_\perp + I_\|)} \qquad (1)$$

serves as a valuable metric for the alignment of the film. A DR value of 0 is expected from a sample with no alignment and a DR value of −1 is expected for a perfectly aligned sample. A DR value of −0.10±0.08 was calculated for the graphene oxide film with no reduction suggesting marginal alignment along the plane of the glass substrate. Upon reduction with vapor phenylhydrazine, the dichroism is decreased slightly. FIG. 14 shows the intensity of the C K-edge π* resonance acquired for a graphene oxide film as a function of incident X-ray angle after reduction with vapor phenylhydrazine under vacuum. The DR value was calculated to be 0.07±0.08, suggesting little to no alignment in the film. Vapor phenylhydrazine has been shown to be a strong reducing agent but seems to remove alignment in the films. A possible explanation is the vapor phenylhydrazine is able to reduce more than the surface layers of the GO film and is able to penetrate deeper into the embedded layers. Annealing the GO film helps to remove the residual phenylhydrazine deep inside the film but as the phenylhydrazine escapes, the individual graphene platelets start to crumple, no longer being adhered to the substrate or to adjacent layers by functional groups. In contrast, the DR found in the GO film reduced by liquid phenylhydrazine is −0.23±0.08, which is a significant improvement over GO. In this case defunctionalization may lead to improved π to π stacking of successive layers. In the absence of annealing, the individual sheets do not relax to their thermodynamic equilibrium and this 3D warping is reduced relative to the vapor phenylhydrazine case.

FIG. 14 shows a plot of C K-edge π* intensities as a function of incident X-ray angle after reduction by dipping in liquid phenylhydrazine. A calculated DR value of −0.23±0.08 was found suggesting substantial alignment after reduction. The restoration of the sp$^2$-hybridized graphite domains on the surface of the GO film provides better stacking of graphene platelets as well as stronger π-π interactions from the underlying layers.

FIG. 14 contrasts the π* intensities and cos$^2$θ dependences of the π* resonances. The most well aligned samples (largest slopes) are the ones treated by reducing agents in liquid medium. The least aligned sample is the GO film reduced by vapor phenylhydrazine which however also shows significant restoration of the carbon sp$^2$-hybridized network. This leads to an interesting question, is alignment of the graphene platelets or defunctionalization of functional groups more important to the conductivity of these films? Table 3 contrasts the sheet resistance, thickness of the six films compared to their calculated DR values.

The sheet resistance was calculated using the infinite plane model with finite thickness. The sheet resistance for the liquid phenylhydrazine is unusually high, perhaps due to residual phenylhydrazine left on the surface of the film. The film reduced by sodium borohydride was cracked and had a lot of holes from film due to the reduction process. Measurements on sheet resistance may not be accurate due to bad condition of the film. The aqueous hydrazine is a significantly aligned sample but the defunctionalization was poor due to the low concentration of hydrazine used. This leads to a sheet resistance that is high when compared to the original film with no reduction as well as the other reducing agents.

In conclusion, we have probed the alignment of transfer-printed graphene films prepared by different reduction methods using NEXAFS spectroscopy. Functional group removal on the graphene seems to be the best way to improve conductivity of these films which are attractive candidates in tunable coatings, solar cell material and as an ITO replacement.

EXAMPLE 2

Several examples of the reduction of graphene oxide by post-processing treatment with reducing agents. Data for these films is shown in Table 3. The provided values represent the sheet resistance measured for ~100 nm thick graphene oxide films reduced by different reducing agents. A lower sheet resistance value indicates better recovery of the conjugated graphene structure. A higher dichroic ratio value indicates better alignment of the graphene films on the substrate.

TABLE 3

| Reducing Agent | Dichroic Ratio | Sheet Resistance (kohm/square) |
|---|---|---|
| Vapor hydrazine, annealed | −0.69 ± 0.08 | 6500 ± 1000 |
| Vapor hydrazine, not annealed | −0.33 ± 0.05 | 14000 ± 1500 |
| Liquid phenylhydrazine | −0.33 ± 0.04 | 2000 ± 500 |
| Sodium borohydride | −0.67 ± 0.03 | 5000 ± 3000 |
| Aqueous hydrazine | −0.61 ± 0.07 | 28000 ± 2400 |
| Vapor phenylhydrazine, annealed | −0.04 ± 0.10 | 250 ± 100 |
| Vapor hydrazine, not annealed | −0.47 ± 0.05 | 134000 ± 30000 |
| No reducing agent | −0.42 ± 0.03 | NA |

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A functionalized graphene thin film disposed on a substrate, wherein the thin film is free of detectable pin-hole defects and the thin film has a dichroic ratio value of greater than −0.7 with respect to the substrate.

2. The functionalized graphene thin film of claim 1, wherein the thin film has 1% per unit area or less defects per square centimeter, or wherein the film has 3% or less impurities.

3. The functionalized graphene thin film of claim 1, wherein the surface contamination of the thin film with extraneous impurities is limited to 3% or less surface coverage.

4. The functionalized graphene thin film of claim 1, wherein the thin film covers a continuous area of at least 16 square inches.

5. The functionalized graphene thin film of claim 1, wherein the thin film is functionalized with functional groups selected from fluorides, chlorides, bromides, alkenes, alkynes, epoxides, alcohols, phenols, carboxylic acids, ketones, quinones, lactones, amines, amides, imines, diazo moieties, cyanides, isocyanides, thionylchlorides, thiols, sulfites, sulfates, or a combination thereof.

6. The functionalized graphene thin film of claim 1, wherein the thin film is completely hydrogenated graphene.

7. A graphene thin film disposed on a substrate, wherein the thin film is free of detectable pin-hole defects, the thin film has 3% or less impurities, and the thin film has a dichroic ratio value of greater than −0.7 with respect to the substrate.

8. The graphene thin film of claim 7, wherein the thin film covers a continuous area of at least 16 square inches.

9. A graphene thin film disposed on a substrate, wherein the thin film is free of detectable pin-hole defects, the surface contamination of the thin film with extraneous impurities is limited to 3% or less surface coverage, and the thin film has a dichroic ratio value of greater than −0.7 with respect to the substrate.

10. The graphene thin film of claim 9, wherein the thin film covers a continuous area of at least 16 square inches.

* * * * *